United States Patent
Lee et al.

(10) Patent No.: US 11,211,671 B2
(45) Date of Patent: Dec. 28, 2021

(54) POROUS FILM, SEPARATOR INCLUDING THE SAME, ELECTROCHEMICAL DEVICE INCLUDING SEPARATOR, AND METHOD OF PREPARING POROUS FILM

(71) Applicant: Samsung Electronics Co., Ltd., Suwon-si (KR)

(72) Inventors: Hyunchul Lee, Hwaseong-si (KR); Junhwan Ku, Seongnam-si (KR); Hyeokjo Gwon, Hwaseong-si (KR); Nagjong Kim, Suwon-si (KR); Chilhee Chung, Seoul (KR); Sangmin Ji, Yongin-si (KR); Jinkyu Kang, Hwaseong-si (KR); Changduk Kang, Gwacheon-si (KR); Ryounghee Kim, Uiwang-si (KR); Minsang Kim, Anseong-si (KR); Euncheol Do, Seoul (KR); Kitae Park, Seoul (KR); Sunghaeng Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 103 days.

(21) Appl. No.: 16/196,729

(22) Filed: Nov. 20, 2018

(65) Prior Publication Data
US 2019/0221809 A1   Jul. 18, 2019

(30) Foreign Application Priority Data
Jan. 16, 2018   (KR) .......................... 10-2018-0005747

(51) Int. Cl.
*H01M 50/44*    (2021.01)
*C08J 5/22*     (2006.01)
*H01M 10/052*   (2010.01)
*D21H 11/18*    (2006.01)
(Continued)

(52) U.S. Cl.
CPC .............. *H01M 50/44* (2021.01); *B32B 5/18* (2013.01); *B32B 5/32* (2013.01); *B32B 21/02* (2013.01);
(Continued)

(58) Field of Classification Search
CPC ............ H01M 2/1626; H01M 2/1686; H01M 10/052; C08J 5/2212
See application file for complete search history.

(56) References Cited

U.S. PATENT DOCUMENTS 5,092,977 A * 3/1992 Bachot .................... C25B 13/04
                                                       204/252
5,636,155 A   6/1997 Kabuo
(Continued)

FOREIGN PATENT DOCUMENTS

JP   1995-093132 A      4/1995
KR   10-0276090 B1      9/2000
WO   WO 2014-017335 A1  1/2014

*Primary Examiner* — Hai Vo
(74) *Attorney, Agent, or Firm* — Cantor Colburn LLP

(57) ABSTRACT

Provided herein are a porous film, a separator including the same, an electrochemical device including the separator, and a method of preparing the porous film. The porous film includes first cellulose nanofibers which is impregnated with a carbonate-based solvent-containing electrolyte solution and has a reaction heat of 150 J/g or less at a temperature ranging from about 30° C. to about 300° C., as measured by differential scanning calorimetry (DSC).

15 Claims, 6 Drawing Sheets

(51) Int. Cl.
*D21H 21/22* (2006.01)
*B32B 21/02* (2006.01)
*B32B 21/10* (2006.01)
*B32B 5/18* (2006.01)
*B32B 5/32* (2006.01)
*H01M 50/429* (2021.01)
*H01M 50/449* (2021.01)

(52) U.S. Cl.
CPC ............ *B32B 21/10* (2013.01); *C08J 5/2212* (2013.01); *D21H 11/18* (2013.01); *D21H 21/22* (2013.01); *H01M 10/052* (2013.01); *H01M 50/4295* (2021.01); *H01M 50/449* (2021.01); *B32B 2262/062* (2013.01); *Y10T 428/249965* (2015.04); *Y10T 428/249986* (2015.04)

(56) References Cited

U.S. PATENT DOCUMENTS

| | | |
|---|---|---|
| 6,511,774 B1 | 1/2003 | Tsukuda et al. |
| 2015/0010828 A1 | 1/2015 | Kubo et al. |
| 2015/0171395 A1 | 6/2015 | Ikuma et al. |
| 2015/0333306 A1* | 11/2015 | Lee ................... H01M 2/1646 429/341 |
| 2016/0156009 A1 | 6/2016 | Hirano et al. |
| 2016/0190534 A1* | 6/2016 | Kimura ................ H01M 2/145 429/403 |
| 2018/0114967 A1* | 4/2018 | Kim ................... H01M 2/1626 |
| 2019/0088416 A1* | 3/2019 | Muraoka ........... H01M 10/0525 |
| 2019/0109309 A1* | 4/2019 | Kim .................. H01M 10/0525 |
| 2019/0252665 A1* | 8/2019 | Chambers ......... H01M 10/4235 |

* cited by examiner

POROUS FILM, SEPARATOR INCLUDING THE SAME, ELECTROCHEMICAL DEVICE INCLUDING SEPARATOR, AND METHOD OF PREPARING POROUS FILM

CROSS-REFERENCE TO RELATED APPLICATION

This application claims the benefit of Korean Patent Application No. 10-2018-0005747, filed on Jan. 16, 2018, in the Korean Intellectual Property Office, the entire disclosure of which is hereby incorporated by reference.

BACKGROUND

1. Field

The present disclosure relates to porous films, separators including the porous film, electrochemical devices including the separators, and methods of preparing the porous films.

2. Description of the Related Art

Electrochemical batteries such as lithium secondary batteries include a separator that separates a positive electrode from a negative electrode to prevent a short circuit. Separators must have certain properties, such as resistance to an electrolyte solution, low internal resistance, and the like. Recently, demand has increased for heat-resistant batteries for use in automobiles and the like. In presently available lithium secondary batteries, a porous film formed of a polyolefin-based material such as polyethylene or polypropylene is used. However, polyolefin-based separators are not well-suited for use in automobile applications because batteries for automobiles require heat resistance at a high temperature, i.e., 150° C. or more.

Cellulose-containing porous films have high heat resistance, and thus are suitable for use as separators of batteries for automobiles. Cellulose contains a hydroxyl group on a surface thereof, which undergoes a side reaction with the electrolyte solution of a lithium secondary battery. This side reaction between the cellulose-containing porous film and the electrolyte solution adversely affects the performance of lithium secondary batteries. Therefore, there is a need for a cellulose-containing porous film in which a side reaction with an electrolyte solution is suppressed.

SUMMARY

Provided are porous films in which a side reaction with an electrolyte solution is suppressed.

Provided are separators including the porous films.

Provided are electrochemical devices including the separators.

Provided are methods of preparing the porous films.

According to an aspect of an embodiment, a porous film may include cellulose nanofibers impregnated with a carbonate-based solvent-containing electrolyte solution. The porous film may have a reaction heat of 150 J/g or less at a temperature ranging from about 30° C. to about 300° C., the reaction heat being measured by differential scanning calorimetry (DSC).

According to an aspect of another embodiment, a separator may include the porous film.

According to an aspect of another embodiment, an electrochemical device may include the separator.

According to an aspect of another embodiment, a method of preparing a porous film may include: applying a composition comprising paper mulberry pulp cellulose nanofibers and a hydrophilic pore-forming agent onto a substrate; drying the second composition to form a sheet on the substrate; and preparing a porous film consisting of the sheet by separating the sheet from the substrate.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
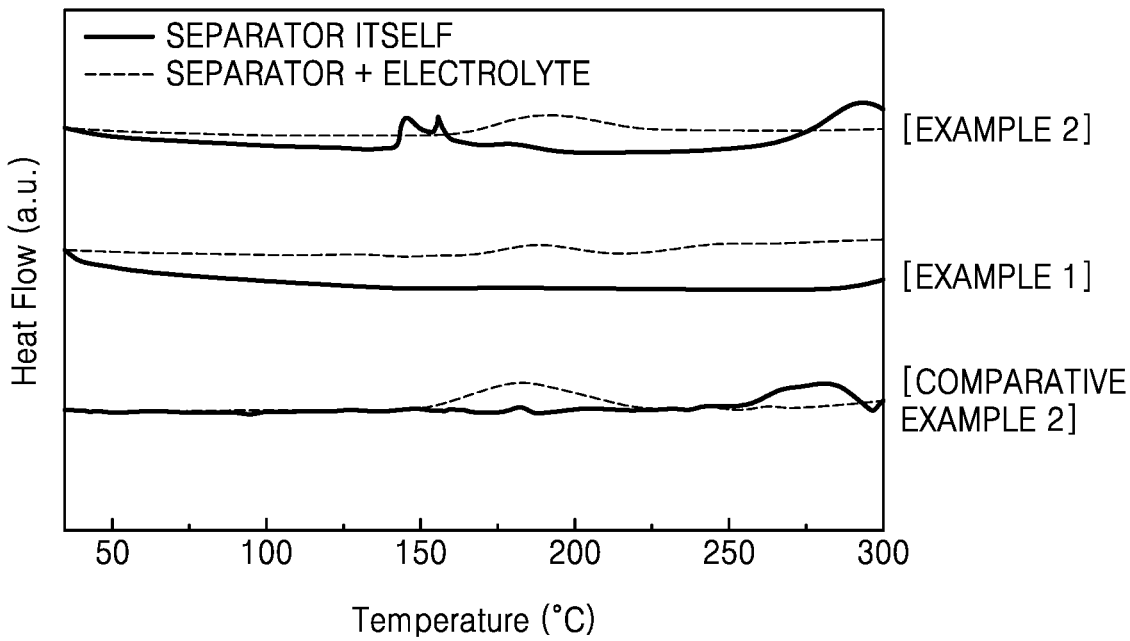
FIG. 1 is a differential scanning calorimetry (DSC) thermogram of porous films prepared according to Examples 1 and 2 and Comparative Example 2.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, example embodiments will be illustrated in the drawings and described in the detailed description in detail. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used in the following description is used only to describe specific embodiments and is not intended to limit the present disclosure. An expression in the singular includes an expression in the plural unless the content clearly indicates otherwise. In the following description, it should be understood that terms, such as "include" and "have", are used to indicate the presence of stated features, numbers, steps, operations, elements, parts, components, materials, or a combination thereof described in the specification without excluding in advance the possibility of the presence or addition of one or more other features, numbers, steps, operations, elements, parts, components, materials, or combinations thereof.

In the drawings, thicknesses are enlarged or reduced to clearly represent various layers and regions. Throughout the specification, like reference numerals denote like elements. In the entire specification, when a portion of a layer, a film, a region, a plate, or the like is referred to as being "on" or "above" another portion, it includes not only a case in which the portion is directly on the other portion, but also a case in which an intervening portion is present therebetween. Throughout the specification, although terms such as "first," "second," and the like may be used to described various components, such components must not be limited by the above terms. The above terms are used only to distinguish one component from another.

Hereinafter, according to one or more embodiments, porous films, separators including the same, electrochemical devices including the separators, and methods of preparing the porous films will be described in further detail.

A porous film according to an embodiment includes cellulose nanofibers. The porous film, which includes the cellulose nanofibers is impregnated with a carbonate-based solvent-containing electrolyte solution, and has a reaction heat of 150 J/g or less at a temperature ranging from about 30° C. to about 300° C., measured by differential scanning calorimetry (DSC). The "reaction heat" means a difference in calorific value determined by DSC between porous films not impregnated with the electrolyte solution compared to those films impregnated with the electrolyte solution.

Because the porous film including cellulose nanofibers, which is impregnated with a carbonate-based solvent-containing electrolyte solution, has a low reaction heat, i.e., 150 J/g or less at a temperature ranging from about 30° C. to about 300° C., side reactions between the porous film and the electrolyte solution is suppressed, and deterioration of the film due to side reactions is prevented. The porous film including cellulose nanofibers refers to a porous film obtained by casting a composition including cellulose nanofibers and a pore-forming agent, removing the pore-forming agent, and drying the resulting composition. The porous film including cellulose nanofibers may refer to a porous film formed of only cellulose nanofibers or a porous film substantially formed of cellulose nanofibers. The porous film includes cellulose nanofibers, and the reaction heat of the porous film including the cellulose nanofibers, which is impregnated with a carbonate-based solvent-containing electrolyte solution, is measured by DSC at a temperature ranging from about 30° C. to about 300° C. is 145 J/g or less, 140 J/g or less, 130 J/g or less, 120 J/g or less, 110 J/g or less, 100 J/g or less, 90 J/g or less, 80 J/g or less, 70 J/g or less, 60 J/g or less, or 50 J/g or less.

In the case of the porous film formed of only cellulose nanofibers, an exothermic peak does not appear at a temperature ranging from about 250° C. to about 300° C. in a DSC thermogram, as is observed with conventional wood-based cellulose nanofibers or microbial cellulose nanofibers, which do have an exothermic peak at a temperature ranging from about 250° C. to about 300° C. The porous film including the cellulose nanofibers substantially does not contain a surface functional group or the like that causes pyrolysis at a temperature ranging from about 250° C. to about 300° C.

In an X-ray diffraction (XRD) spectrum of the porous film including the cellulose nanofibers, a crystalline index, i.e., an intensity ratio $((I_{002}-I_{AM})/I_{002})$ of a crystalline peak intensity $(I_{002}-I_{AM})$ to a total peak intensity $I_{002}$ of a (002) crystal plane, wherein the crystalline peak intensity is a difference between the total peak intensity $I_{002}$ of the (002) crystal plane and a peak intensity $I_{AM}$ of an amorphous phase, ranges from about 0.80 to less than about 0.90, about 0.80 to about 0.89, about 0.80 to about 0.88, about 0.80 to about 0.87, about 0.80 to about 0.86, about 0.80 to about 0.85, or about 0.80 to about 0.84. For example, an electrochemical device including the porous film having the crystalline index within this range exhibits enhanced cycle characteristics.

The porous film may have a Gurley value, which corresponds to air permeability, of, for example, about 50 sec/100 cc to about 800 sec/100 cc, about 100 sec/100 cc to about 750 sec/100 cc, about 150 sec/100 cc to about 700 sec/100 cc, about 200 sec/100 cc to about 650 sec/100 cc, about 250 sec/100 cc to about 600 sec/100 cc, about 300 sec/100 cc to about 600 sec/100 cc, about 350 sec/100 cc to about 600 sec/100 cc, about 350 sec/100 cc to about 550 sec/100 cc, or about 350 sec/100 cc to about 500 sec/100 cc. The Gurley value is measured using a method in accordance with Gurley Method JIS P8117. When the Gurley value is too low, lithium is easily deposited in pores of the porous film. Thus, when a Gurley value of a porous film used as a separator in a lithium battery is too low, lithium blocking characteristics deteriorate, and thus a short circuit due to lithium dendrites easily occurs. When the Gurley value of the porous film is too high, the transfer of lithium ions through the porous film is inhibited. Thus, when a Gurley value of a porous film used as a separator in a lithium battery is too high, internal resistance of the lithium battery is increased, resulting in deteriorated cycle characteristics of the lithium battery. In addition, the porous film has a uniform Gurley value over its entire area. Since the porous film has uniform air permeability, current density is uniformly distributed in an electrolyte of a lithium battery including the porous film as a separator, and thus a side reaction, such as deposition of crystals at an interface between an electrode and an electrolyte, is suppressed.

The porous film may have a porosity of, for example, about 10% to about 90%, about 15% to about 85%, about 20% to about 80%, about 25% to about 80%, about 30% to about 80%, about 35% to about 80%, about 35% to about 75%, or about 40% to about 75%. Even when the porosity of the porous film is less than 10%, an electrochemical device including the porous film may operate, but internal resistance thereof is increased, and thus output is reduced, resulting in deteriorated performance of the electrochemical device. When the porosity of the porous film is greater than 90%, internal resistance is excessively reduced, and thus output characteristics of an electrochemical device, for example, cycle characteristics of a lithium battery, may be enhanced, but the possibility of occurrence of a short circuit due to lithium dendrites is increased, resulting in reduced stability. The porosity of the porous film is measured using a liquid or gas adsorption method in accordance with ASTM D-2873 (Standard Test Method for Interior Porosity of Poly(Vinyl Chloride) (PBC) Resins by Mercury Intrustion Porosimetry).

The porous film may have a tensile strength of, for example, 50 kgf/cm$^2$ or more, 80 kgf/cm$^2$ or more, 100 kgf/cm$^2$ or more, 150 kgf/cm$^2$ or more, 200 kgf/cm$^2$ or more, 250 kgf/cm$^2$ or more, 300 kgf/cm$^2$ or more, 350 kgf/cm$^2$ or more, 350 kgf/cm$^2$ or more, or 450 kgf/cm$^2$ or more. The tensile strength of the porous film may range from, for example, about 50 kgf/cm$^2$ to about 1,000 kgf/cm$^2$, about 50 kgf/cm$^2$ to about 900 kgf/cm$^2$, about 50 kgf/cm$^2$ to about 800 kgf/cm$^2$, about 50 kgf/cm$^2$ to about 700 kgf/cm$^2$, about 50 kgf/cm$^2$ to about 600 kgf/cm$^2$, about 50 kgf/cm$^2$ to about 500 kgf/cm$^2$, or about 50 kgf/cm$^2$ to about 450 kgf/cm$^2$. When the tensile strength of the porous film is within the above range, it is possible to achieve a minimum tensile strength required for the manufacture of a winding-type battery, and puncture strength is further enhanced. Thus, when such a porous film is used as a separator, the separator exhibits increased durability during charging and discharging of a lithium battery, and the thickness of the separator is reduced, and, accordingly, battery capacity is further increased. When the tensile strength of the porous film is less than 50 kgf/cm$^2$, the separator has reduced durability, which leads to breakage of the separator when a battery is manufactured, resulting in reduced manufacturing yield, rendering such a film unsuitable for the manufacture of a winding-type battery. In addition, when the tensile strength of the porous film is less than 50 kgf/cm$^2$, puncture strength is low and thus durability is low, and the thickness of the separator must be increased to secure minimum tension, resulting in decreased battery capacity. The tensile strength is measured in accordance with ASTM D-638 (Standard Test Method for Tensile Properties of Plastics).

The cellulose nanofibers included in the porous film are, for example, paper mulberry pulp cellulose nanofibers. Paper mulberry pulp cellulose nanofibers refer to cellulose nanofibers obtained by defibrating (pulping or fiberizing) paper mulberry pulp. Without wishing to be bound by any particular theory or mechanism of action, it is believed that paper mulberry pulp cellulose nanofibers helps to reduce side reactions between the porous film and an electrolyte solution, and deterioration of a lithium battery including the porous film as a separator is thereby suppressed.

The amount of the cellulose nanofibers included in the porous film ranges from, for example, 1 wt % or more, 5 wt % or more, 10 wt % or more, 20 wt % or more, 30 wt % or more, 40 wt % or more, 50 wt % or more, 60 wt % or more, 70 wt % or more, 80 wt % or more, or 90 wt % or more, with respect to a total weight of the porous film. The amount of the cellulose nanofibers included in the porous film ranges from, for example, about 1 wt % to about 100 wt %, about 5 wt % to about 100 wt %, about 10 wt % to about 99 wt %, about 20 wt % to about 95 wt %, about 30 wt % to about 95 wt %, about 40 wt % to about 95 wt %, or about 50 wt % to about 90 wt %, with respect to the total weight of the porous film. It is believed that thermal stability of the porous film is enhanced when the cellulose nanofibers are present in the stated amounts.

In some embodiments, the porous film further comprises one or more of a cross-linking agent, a binder, inorganic particles, and at least one highly heat-resistant elongation polymer selected from polyamide nanofibers, polyolefin, highly heat-resistant aramid fibers, polyimide, polyethyleneterephthalate (PET), polyacrylonitrile (PAN), polyvinylidene fluoride (PVDF), and the like. Since the porous film further includes these components, it is easy to adjust physical properties of the porous film.

Since the porous film further includes a cross-linking agent and/or a binder, the tensile strength of the porous film is further enhanced. The cross-linking agent aids in binding of cellulose nanofibers. The cross-linking agent may be added in an amount of about 1 part by weight to about 50 parts by weight with respect to 100 parts by weight of cellulose nanofibers, but the amount of the cross-linking agent is not necessarily limited to the above range, and may be within any range that may enhance physical properties of the porous film. The amount of the cross-linking agent ranges from, for example, about 1 part by weight to about 30 parts by weight, about 1 part by weight to about 20 parts by weight, or about 1 part by weight to about 15 parts by weight, with respect to 100 parts by weight of cellulose nanofibers. The cross-linking agent may be, for example, at least one selected from isocyanate, polyvinyl alcohol, and polyamide epichlorohydrin (PAE), but is not necessarily limited to the above examples, and may be any cross-linking agent that may be used in the art.

The binder aids in binding of cellulose nanofibers. The binder may be added in an amount of about 1 part by weight to about 50 parts by weight with respect to 100 parts by weight of cellulose nanofibers, but the amount of the binder is not necessarily limited to the above range, and may be within any range that may enhance physical properties of the porous film. The amount of the binder ranges from, for example, about 1 part by weight to about 30 parts by weight, about 1 part by weight to about 20 parts by weight, or about 1 part by weight to about 15 parts by weight, with respect to 100 parts by weight of cellulose nanofibers. The binder may be, for example, at least one selected from cellulose single nanofiber, methyl cellulose, hydroxypropyl methylcellulose, hydroxyethyl methyl cellulose, carboxyl methyl cellulose, ethyl cellulose, polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, and polyvinylalcohol, but the present disclosure is not necessarily limited to the above examples, and the binder may be any binder used in the art.

The inorganic particles enhance mechanical and physical properties of the porous film. Non-limiting examples of the inorganic particles include: a metal oxide selected from alumina ($Al_2O_3$), silica ($SiO_2$), titania ($TiO_2$), $HfO_2$, $SrTiO_3$, $SnO_2$, $CeO_2$, $Na_2O$, MgO, NiO, CaO, BaO, ZnO, $ZrO_2$, $Y_2O_3$, $BaTiO_3$, $Li_2O$, RaO, CaO, SrO, $Sc_2O_3$, $Ce_2O_3$, and cage-type silsesquioxane; a metal nitride selected from ZrN, TaN, HfN, VN, NbN, $Cr_2N$, TaN, CrN, GeN, $TLi_3N$, $Mg_3N_2$, $Ca_3N_2$, $Sr_3N_2$, $Ba_3N_2$, BN, AlN, and TiN; a metal oxynitride selected from tantalum oxynitride (TaON), zirconium oxynitride ($ZrO_xN_y$, where $0<x<2, 0<y<3$), and lithium phosphorus oxynitride (LiPON); a metal carbide selected from TiC, ZrC, HfC, NbC, TaC, $Cr_3C_2$, $Mo_2C$, WC, and SiC; a metal-organic framework (MOF); a lithiated compound of each of the above-listed compounds; one or more ceramic conductors selected from $Li_{1+x+y}Al_xTi_{2-x}Si_yP_{3-y}O_{12}$ where $0<x<2$ and $0\leq y<3$, $BaTiO_3$, $Pb(Zr,Ti)O_3$ (PZT), $Pb_{1-x}La_xZr_{1-y}Ti_yO_3$ (PLZT) where $0\leq x<1$ and $0y<1$, $Pb(Mg_3Nb_{2/3})O_3$—$PbTiO_3$ (PMN-PT), lithium phosphate ($Li_3PO_4$), lithium titanium phosphate ($Li_xTi_y(PO_4)_3$ where $0<x<2$ and $0<y<3$, lithium aluminum titanium phosphate ($Li_xAl_yTi_z(PO_4)_3$ where $0<x<2$, $0<y<1$, and $0<z<3$, $Li_{1+x+y}(Al, Ga)_x(Ti, Ge)_{2-x}Si_yP_{3-y}O_{12}$ where $0\leq x\leq 1$ and $0\leq y\leq 1$, lithium lanthanum titanate ($Li_xLa_yTiO_3$ where $0<x<2$ and $0<y<3$), lithium germanium thiophosphate ($Li_xGe_yP_zS_w$ where $0<x<4$, $0<y<1$, $0<z<1$, and $0<w<5$), lithium nitride ($Li_xN_y$ where $0<x<4$ and $0<y<2$), $SiS_2(Li_xSi_yS_z$ where $0<x<3, 0<y<2$, and $0<z<4$)-based glass, $P_2S_5(Li_xP_yS_z$ where $0<x<3$, $0<y<3$, and $0<z<7$)-based glass, $Li_2O$—$Al_2O_3$—$SiO_2$—$P_2O_5$—$TiO_2$—$GeO_2$-based ceramic, and Garnet-based ceramic $Li_{3+x}La_3M_2O_{12}$ where $0\leq x\leq 5$ wherein M=Te, Nb, or Zr; and a carbonaceous nanostructure such as graphene, carbon nanotubes (CNTs), and carbon nanofibers (CNFs), but the present disclosure is not limited to the above examples, and the inorganic particles may be any inorganic particles used in the art. The inorganic particles may have a diameter of, for example, about 1 nm to about 10 μm.

The polyamide nanofibers enhance the tensile strength of the porous film. The polyamide nanofibers may be, for example, but are not limited to, aramid nanofibers, nylon nanofibers, or the like, and may be any polyamide nanofibers that may be used in the art.

A polyolefin, which is a material of an existing general porous film or the porous film, enhances flexibility of the porous film. Non-limiting examples of the polyolefin include polyethylene and polypropylene. The polyolefin is, for example, in the form of a single layer or multiple layers including at least two layers. The polyolefin is, for example, in the form of two layers of polyethylene/polypropylene, three layers of polyethylene/polypropylene/polyethylene, three layers of polypropylene/polyethylene/polypropylene, or the like, but the present disclosure is not limited to the above examples, and the polyolefin may be any polyolefin that may be used in the art.

In somes embodiment, the porous film further includes a second type of cellulose nanofibers different from the first type of cellulose nanofibers discussed above (hereinafter referred to as first and second cellulose nanofibers). The second cellulose nanofibers are, for example, natural cellulose such as plant cellulose nanofibers (other than paper mulberry pulp cellulose nanofibers), animal cellulose nanofibers, or microbial cellulose nanofibers. Non-limiting examples of the second cellulose nanofibers include coniferous wood pulp, deciduous wood pulp, cotton-based pulp such as cotton linter, non-wood-based pulp such as wheat straw pulp and bagasse pulp, cellulose separated from bacterial cellulose or Ascidiacea, and cellulose separated from seaweed.

The second cellulose nanofibers are, for example, carboxyl group-containing cellulose nanofibers. For example, the carboxyl group of the cellulose nanofibers of the porous film is a carboxyl group bound to carbon atoms forming a pyranose ring, and the carboxyl group is represented by Formula 1 or 2 below:

$$-R_1-O-R_2-COOM \qquad \text{<Formula 1>}$$

$$-O-R_2-COOM. \qquad \text{<Formula 2>}$$

In Formulae 1 and 2, $R_1$ and $R_2$ are each independently a substituted or unsubstituted $C_1$-$C_{10}$ alkylene group, and M is hydrogen or an alkali metal. For example, the alkali metal is lithium, sodium, potassium, or the like. For example, $R_1$ and $R_2$ are each independently a methylene group. For example, the carboxyl group bound to carbon atoms forming a pyranose ring, included in the carboxyl group-containing cellulose nanofibers, is 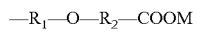—$CH_2OCH_2COONa$ or —$OCH_2COONa$. 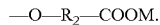 The pyranose ring is, for example, glucopyranose.

Thus, the carboxyl group of Formula 1 or 2 included in the carboxyl group-containing cellulose nanofibers has a specific structure different from that of a carboxyl group having the formula of —COOM which is bound to carbon atoms forming a pyranose ring in conventional oxidized cellulose nanofibers obtained through chemical oxidation.

The content of the carboxyl group of the carboxyl group-containing cellulose nanofibers used as second cellulose nanofibers is, for example, 0.02 mmol/g or more, 0.06 mmol/g or more, 0.10 mmol/g or more, 0.15 mmol/g or more, or 0.20 mmol/g or more. The content of the carboxyl group of the carboxyl group-containing cellulose nanofibers included in the porous film ranges from, for example, about 0.02 mmol/g to about 10 mmol/g, about 0.02 mmol/g to about 5 mmol/g, about 0.02 mmol/g to about 3 mmol/g, about 0.02 mmol/g to about 2 mmol/g, or about 0.02 mmol/g to about 1 mmol/g. Since the second cellulose nanofibers include the carboxyl group-containing cellulose nanofibers having a carboxyl group content within the above ranges, the porous film including the same provides further enhanced tensile strength and tensile modulus. For a method of measuring the content of the carboxyl group of the cellulose nanofibers, refer to Evaluation Example 8.

The carboxyl group-containing cellulose nanofibers used as the second cellulose nanofibers may have an average diameter of, for example, 100 nm or less, 80 nm or less, 60 nm or less, 50 nm or less, 45 nm or less, 40 nm or less, 35 nm or less, 30 nm or less, or 25 nm or less. The average diameter of the cellulose nanofibers of the porous film ranges from, for example, about 1 nm to about 100 nm, about 1 nm to about 80 nm, about 1 nm to about 60 nm, about 1 nm to about 50 nm, about 1 nm to about 45 nm, or about 5 nm to about 45 nm. Since the porous film includes the carboxyl group-containing cellulose nanofibers having an average diameter within the above ranges, the tensile strength of the porous film is further enhanced. For a method of measuring the average diameter of the carboxyl group-containing cellulose nanofibers, refer to Evaluation Example 9.

In a diameter distribution curve of the carboxyl group-containing cellulose nanofibers used as the second cellulose nanofibers, a full width at half maximum (FWHM) of a diameter peak may be, for example, 50 nm or less, 45 nm or less, 40 nm or less, 35 nm or less, 30 nm or less, 25 nm or less, 20 nm or less, 15 nm or less, or 10 nm or less. In the diameter distribution curve of the carboxyl group-containing cellulose nanofibers, the FWHM of the diameter peak may range from, for example, about 1 nm to about 45 nm, about 5 nm to about 45 nm, or about 10 nm to about 45 nm. The porous film including the carboxyl group-containing cellulose nanofibers having a FWHM within the above ranges exhibits further enhanced uniformity, and further enhanced tensile strength due to increased contacts between fibers.

The carboxyl group-containing cellulose nanofibers may be, for example, carboxyl group-containing microbial or bacterial cellulose nanofibers. That is, the carboxyl group-containing microbial or bacterial cellulose nanofibers are, for example, a fermentation product of a culture solution including a microorganism and directly obtained from a culture solution including a microorganism. Thus, the carboxyl group-containing microbial or bacterial cellulose nanofibers included in the porous film are distinguished from a simple mixture of existing general microbial or bacterial cellulose nanofibers and a carboxyl group-containing compound. In addition, the carboxyl group-containing microbial or bacterial cellulose nanofibers are also distinguished from wood-based cellulose nanofibers obtained by decomposing a wood-based material. The carboxyl group-containing microbial or bacterial cellulose nanofibers used as the second cellulose nanofibers have an absorption peak corresponding to a carboxyl group at around 1,572 $cm^{-1}$ in an infrared (IR) spectrum. Carboxyl group-free microbial or bacterial cellulose does not exhibit such an absorption peak.

The carboxyl group-containing microbial or bacterial cellulose nanofibers are obtained using, for example, a microorganism derived from the genus *Enterobacter*, the genus *Gluconacetobacter*, the genus *Komagataeibacter*, the genus *Acetobacter*, the genus *Achromobacter*, the genus *Agrobacterium*, the genus *Alcaligenes*, the genus *Azotobacter*, the genus *Pseudomonas*, the genus *Rhizobium*, the genus *Sarcina*, the genus *Klebsiella*, or the genus *Escherichia*, but the present disclosure is not necessarily limited to the above examples, and the carboxyl group-containing microbial or bacterial cellulose nanofibers may be any microorganism that produces microbial or bacterial cellulose in the art. The microorganism derived from the genus *Acetobacter* may be, for example, *Actetobacter pasteurianus*. The microorganism derived from the genus *Agrobacterium* may be, for example, *Agrobacterium tumefaciens*. The microorganism derived from the genus *Rhizobium* may be, for example, *Rhizobium leguminosarum*. The microorganism derived from the genus *Sarcina* may be, for example, *Sarcina ventriculi*. The microorganism derived from the genus *Gluconacetobacter* may be, for example, *Gluconacetobacter xylinum*. The microorganism derived from the genus *Klebsiella* may be, for example, *Klebsiella pneumoniae*. The microorganism derived from the genus *Escherichia* may be, for example, *E. coli*.

In one embodiment, the porous film further includes, a combination of different types of second cellulose nanofibers, such as the microbial or bacterial cellulose nanofibers in addition to other cellulose nanofibers. For example, the porous film can comprise second cellulose nanofibers that include microbial or bacterial cellulose nanofibers and wood-based cellulose nanofibers, The present disclosure is not necessarily limited thereto, and the other cellulose nanofibers may be any cellulose nanofibers that may be used in the art and are capable of enhancing the tensile strength of a separator.

The amount of the second cellulose nanofibers may range from about 10 parts by weight to about 300 parts by weight, about 10 parts by weight to about 250 parts by weight, about 10 parts by weight to about 200 parts by weight, about 20 parts by weight to about 180 parts by weight, about 30 parts by weight to about 170 parts by weight, about 40 parts by weight to about 160 parts by weight, about 50 parts by weight to about 150 parts by weight, about 60 parts by weight to about 140 parts by weight, about 70 parts by weight to about 130 parts by weight, about 80 parts by weight to about 120 parts by weight, or about 90 parts by weight to about 110 parts by weight, per 100 parts by weight of the first cellulose nanofibers. It is believed that inclusion of second cellulose nanofibers in the above amount further suppresses deterioration of an electrochemical device including the porous film.

In some embodiments, the porous film has a low contact angle with respect to a polar solvent such as water, and thus provides enhanced wettability with respect to an electrolyte including a polar solvent. A contact angle of the porous film with respect to water at 20° C. may be, for example, 60° or less, 50° or less, 40° or less, 30° or less, or 20° or less. When the contact angle of the porous film with respect to water at 20° C. is too high, it is difficult to impregnate the porous film with an electrolyte. When the porous film is used as a separator of a lithium battery, the porous film provides enhanced wettability with respect to an electrolyte, and thus an interface between the separator and an electrode is uniformly impregnated with the electrolyte. Thus, a uniform electrode reaction proceeds at the interface between the separator and an electrode, and, accordingly, the formation of lithium dendrites (for example, due to a local overcurrent or the like) is prevented, resulting in enhanced lifespan characteristics of an electrochemical device.

The porous film provides excellent thermal stability at a high temperature, i.e., at 150° C. or more, thus an electrochemical device including the porous film as a separator exhibits enhanced heat resistance. General olefin-based porous films rapidly contract at a high temperature, i.e., between 150° C. and 200° C., which may disrupt operation of a battery including such a porous film. In some embodiments, the porous film may have a heat shrinkage rate, after being maintained at 150° C. for 30 minutes, of 5% or less, 4.5% or less, 4% or less, 3.5% or less, 3% or less, 2.5% or less, 2% or less, 1.5% or less, or 1% or less.

The porous film can have any suitable structure, such as any of various single-layered or multi-layered structures according to required performance. Porous films according to example embodiments having a single-layered or multi-layered structure will be described with reference to FIGS. 3A to 3I.

Figure 3A:
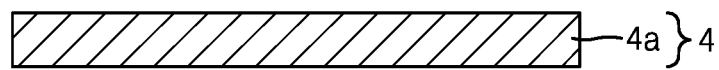
FIGS. 3A to 3I are schematic cross-sectional views of porous films according to example embodiments.

Referring to FIG. 3A, a porous film 4 has a single-layered structure including a layer 4a including first cellulose nanofibers. The layer 4a may include, for example, paper mulberry pulp cellulose nanofibers as the first cellulose nanofibers. The layer 4a may or may not include a polyolefin.

Figure 3B:

Referring to FIG. 3B, the porous film 4 has a single-layered structure including a layer 4b including first cellulose nanofibers and second cellulose nanofibers different from the first cellulose nanofibers. The layer 4b may include paper mulberry pulp cellulose nanofibers as the first cellulose nanofibers, and microbial or bacterial cellulose nanofibers as the second cellulose nanofibers. The layer 4b may or may not include a polyolefin.

Figure 3C:
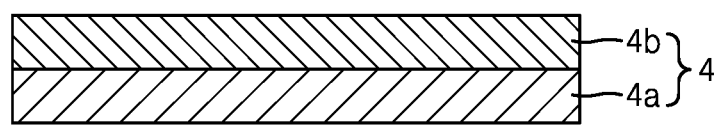

Referring to FIG. 3C, the porous film 4 has a multi-layered structure including: the first layer 4a including first cellulose nanofibers; and the second layer 4b disposed on the first layer 4a (i.e., on a surface of the first layer 4a) and including the first cellulose nanofibers and second cellulose nanofibers. The first layer 4a and the second layer 4b include, for example, paper mulberry pulp cellulose nanofibers as the first cellulose nanofibers, and the second layer 4b includes microbial or bacterial cellulose nanofibers as the second cellulose nanofibers.

Figure 3D:
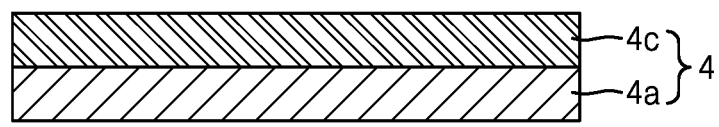

Referring to FIG. 3D, the porous film 4 has a multi-layered structure including: the layer 4a including first cellulose nanofibers; and a second layer 4c disposed on the first layer 4a (i.e., on a surface of the first layer 4a) and not including the first cellulose nanofibers. The first layer 4a includes, for example, paper mulberry pulp cellulose nanofibers as the first cellulose nanofibers, and the second layer 4c includes at least one selected from a cross-linking agent, a binder, inorganic particles, inorganic fibers, polyamide nanofibers, and a polyolefin, but the present disclosure is not necessarily limited to the above examples. That is, any material for forming a porous film that may be used in the art may be used.

Figure 3E:
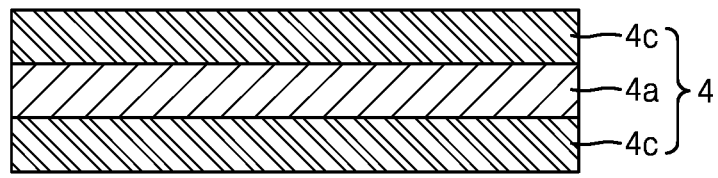

Referring to FIG. 3E, the porous film 4 has a multi-layered structure including: the first layer 4a including first cellulose nanofibers; the second layer 4c disposed on the first layer 4a (i.e., on a first surface of the first layer 4a) and not including the first cellulose nanofibers; and the third layer 4c disposed on a second surface of the first layer 4a and not including the first cellulose nanofibers. Thus, the first layer is between the second and third layers. The first layer 4a includes, for example, paper mulberry pulp cellulose nanofibers as the first cellulose nanofibers, and the second and third layers 4c includes at least one selected from a cross-linking agent, a binder, inorganic particles, inorganic fibers, polyamide nanofibers, and a polyolefin, but the present disclosure is not necessarily limited to the above examples. That is, any material for forming a porous film that may be used in the art may be used.

Figure 3F:
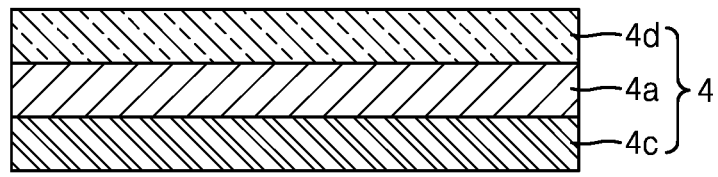

Referring to FIG. 3F, the porous film 4 has a multi-layered structure including: the first layer 4a including first cellulose nanofibers; the second layer 4c disposed on a first surface of the first layer 4a and not including the first cellulose nanofibers; and a third layer 4d disposed on a second surface of the first layer 4a and having a composition different from that of the second layer 3c not including the first cellulose nanofibers. Thus, the first layer is between the second and third layers. The first layer 4a includes, for example, paper mulberry pulp cellulose nanofibers as the first cellulose nanofibers, and the second layer 4c and the third layer 4d each independently include at least one selected from a cross-linking agent, a binder, inorganic particles, inorganic fibers, polyamide nanofibers, and a polyolefin, but the present disclosure is not necessarily limited to the above examples. That is, any material for forming a porous film that may be used in the art may be used.

Figure 3G:
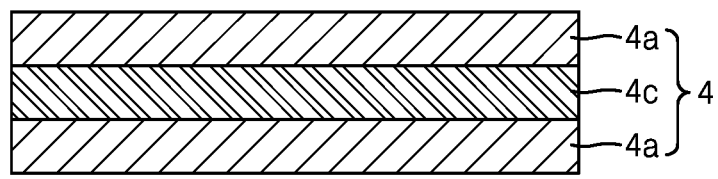

Referring to FIG. 3G, the porous film 4 has a multi-layered structure including: the first layer 4c not including first cellulose nanofibers; the second layer 4a disposed on a first surface of the first layer 4c and including first cellulose nanofibers; and the third layer 4a disposed on a second surface of the first layer 4c and including the first cellulose nanofibers. Thus, the first layer is between the second and third layers. The layer 4a includes, for example, paper mulberry pulp cellulose nanofibers as the first cellulose nanofibers, and the layer 4c includes at least one selected from a cross-linking agent, a binder, inorganic particles, inorganic fibers, polyamide nanofibers, and a polyolefin, but the present disclosure is not necessarily limited to the above examples. That is, any material for forming a porous film that may be used in the art may be used.

Figure 3H:
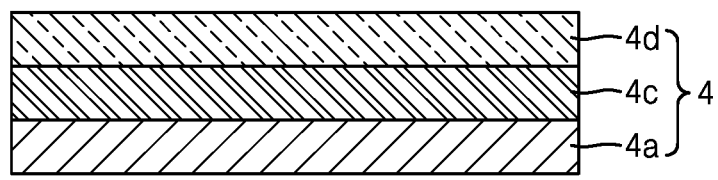

Referring to FIG. 3H, the porous film 4 has a multi-layered structure including: the first layer 4c not including first cellulose nanofibers; the second layer 4a disposed on a first surface of the first layer 4c and including first cellulose nanofibers; and the third layer 4d disposed on a second surface of the layer 4c, not including the first cellulose nanofibers, and having a composition different from that of the layer 4c. Thus, the first layer is between the second and third layers. The layer 4a includes, for example, paper mulberry pulp cellulose nanofibers as the first cellulose nanofibers, the layer 4c and the layer 4d each independently include at least one selected from a cross-linking agent, a binder, inorganic particles, inorganic fibers, polyamide nanofibers, and a polyolefin, but the present disclosure is not necessarily limited to the above examples. That is, any material for forming a porous film that may be used in the art may be used.

Figure 3I:
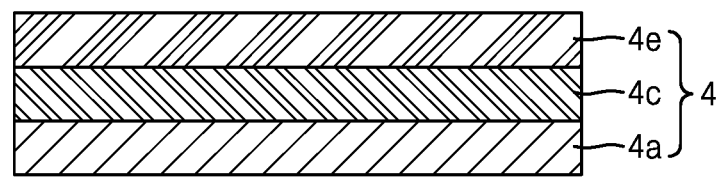

Referring to FIG. 3I, the porous film 4 has a multi-layered structure including: the first layer 4c not including first cellulose nanofibers; the second layer 4a disposed on a first surface of the first layer 4c and including first cellulose nanofibers; and a third layer 4e disposed on a second surface of the layer 4c, including the first cellulose nanofibers, and having a composition different from that of the layer 4a. Thus, the first layer is between the second and third layers. The layer 4a and the layer 4e include, for example, paper mulberry pulp cellulose nanofibers as the first cellulose nanofibers, and the layer 4c includes at least one selected from a cross-linking agent, a binder, inorganic particles, inorganic fibers, polyamide nanofibers, and a polyolefin, but the present disclosure is not necessarily limited to the above examples. That is, any material for forming a porous film that may be used in the art may be used. The layer 4e may or may not include a polyolefin.

Referring to FIGS. 3A to 3I, at least one of the layer 4a, the d layer 4b, the layer 4c, the layer 4d, and the layer 4e included in the porous film 4 includes at least one selected from a cross-linking agent, a binder, inorganic particles, and at least one highly heat-resistant elongation polymer selected from polyamide nanofibers, a polyolefin, highly heat-resistant aramid fibers, polyimide, polyethyleneterephthalate (PET), polyacrylonitrile (PAN), polyvinylidene fluoride (PVDF), and the like.

The porous film may have a thickness of, for example, 200 μm or less. The thickness of the porous film may be, for example, 100 μm or less, 90 μm or less, 80 μm or less, 70 μm or less, 60 μm or less, 50 μm or less, 40 μm or less, 35 μm or less, 30 μm or less, 25 μm or less, 19 μm or less, 18 μm or less, or 17 μm or less. The porous film has a decreased thickness within any of the above ranges and low reactivity with an electrolyte solution, and thus the energy density of an electrochemical battery including the porous film as a separator is enhanced and deterioration of the electrochemical battery is suppressed.

A separator according to another embodiment includes the above-described porous film.

The porous film is, for example, directly used as a separator. When the porous film is used as a separator in an electrochemical device, the transfer of ions between electrodes is possible and electrical contact between the electrodes is prevented, thereby enhancing performance of the electrochemical device. In addition, as a side reaction between the porous film and an electrolyte solution is suppressed, deterioration of the electrochemical device is suppressed, thus, cycle characteristics of the electrochemical device are enhanced.

An electrochemical device according to another embodiment includes: a positive electrode, a negative electrode, and the above-described separator located between the positive electrode and the negative electrode. Since the electrochemical device includes the above-described separator, deterioration thereof is suppressed, resulting in enhanced lifespan characteristics.

The electrochemical device is not particularly limited, and may be any electrochemical device known in the art that is capable of storing and/or emitting electricity by an electrochemical reaction. The electrochemical device may be, for example, an electrochemical battery, an electric double layer capacitor, or the like. The electrochemical battery may be, for example, an alkali metal battery such as a lithium battery, a sodium battery, or the like, or a fuel cell or the like. The electrochemical battery may be a primary battery or a rechargeable secondary battery. The lithium battery may be a lithium ion battery, a lithium polymer battery, a lithium sulfur battery, a lithium metal battery, a lithium air battery, or the like.

The lithium battery may be manufactured using, for example, the following method, but the present disclosure is not limited thereto, and the method may be any fabrication method that enables the operation of a lithium battery.

First, a negative electrode is prepared according to a negative electrode fabrication method. A negative active material, a conductive material, a binder, and a solvent may be mixed to prepare a negative active material composition, and the negative active material composition may be directly coated on a current collector such as copper foil or the like to thereby fabricate a negative electrode plate. In another embodiment, the negative active material composition may be cast on a separate support and a negative active material film separated from the support may be laminated on a copper current collector to thereby fabricate a negative electrode plate. The negative electrode is not limited to the above-described type, and may be of other types.

The negative active material may be any negative active material that may be used as a negative active material of a lithium battery in the art. For example, the negative active material may include at least one selected from lithium metal, a metal alloyable with lithium, a transition metal oxide, a non-transition metal oxide, and a carbonaceous material.

For example, the metal alloyable with lithium may be silicon (Si), tin (Sn), aluminum (Al), germanium (Ge), lead (Pb), bismuth (Bi), antimony (Sb), a Si-yttrium (Y) alloy (Y is an alkali metal, an alkali earth metal, a Group 13 to 16 element, a transition metal, a rare earth element, or a combination thereof except for Si), a Sn—Y alloy (Y is an alkali metal, an alkali earth metal, a Group 13 to 16 element, a transition metal, a rare earth element, or a combination thereof except for Sn), or the like. Examples of Y include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), and any combination thereof.

The transition metal oxide may be, for example, lithium titanium oxide, vanadium oxide, lithium vanadium oxide, or the like.

The non-transition metal oxide may be, for example, $SnO_2$, $SiO_x$ where $0<x<2$, or the like.

The carbonaceous material may be crystalline carbon, amorphous carbon, or a mixture thereof. Examples of the crystalline carbon include natural graphite and artificial graphite, each of which has an irregular form or a plate, flake, spherical, or fibrous form. Examples of the amorphous carbon include, but are not limited to, soft carbon (low-temperature calcined carbon), hard carbon, mesophase pitch carbide, and calcined coke.

The conductive material may be acetylene black, natural graphite, artificial graphite, carbon black, Ketjen black, carbon fiber, metallic powder such as copper, nickel, aluminum, silver, or the like, metal fiber, or the like. In some embodiments, conductive materials such as polyphenylene derivatives and the like may be used alone or a mixture of two or more of these materials may be used, but the present disclosure is not limited to the above-listed examples. That is, any conductive material known in the art may be used. In addition, the above-described carbonaceous materials may also be used as a conductive material.

Examples of the binder include a vinylidene fluoride/hexafluoropropylene copolymer, polyvinylidene fluoride (PVDF), polyacrylonitrile, polymethyl methacrylate, polytetrafluoroethylene, a mixture of the aforementioned polymers, and a styrene-butadiene rubber-based polymer. However, the binder is not particularly limited to the above examples and may be any binder that is commonly used in the art.

The solvent may be N-methylpyrrolidone, acetone, water, or the like. However, the solvent is not particularly limited to the above examples and may be any solvent used in the art.

The amounts of the negative active material, the conductive material, the binder, and the solvent may be the same levels as those generally used in a lithium battery. At least one of the conductive material and the solvent may not be used according to the use and constitution of desired lithium batteries.

Next, a positive electrode is prepared according to a positive electrode fabrication method. The positive electrode may be fabricated in the same manner as in the negative electrode fabrication method, except that a positive active material is used instead of the negative active material. In addition, in a positive active material composition, a conductive material, a binder, and a solvent may be the same as those used in the negative electrode.

A positive active material composition may be prepared by mixing a positive active material, a conductive material, a binder, and a solvent and may be directly coated onto an aluminum current collector to thereby fabricate a positive electrode plate. In some embodiments, the positive active material composition may be cast onto a separate support and a positive active material film separated from the support may be laminated on an aluminum current collector to thereby fabricate a positive electrode plate. The positive electrode is not limited to the above-described type, and may be of other types.

The positive active material may include at least one selected from lithium cobalt oxide, lithium nickel cobalt manganese oxide, lithium nickel cobalt aluminum oxide, lithium iron phosphate, and lithium manganese oxide. However, the positive active material is not limited to the above examples and any positive active material used in the art may be used.

For example, the positive active material may be a compound represented by one of the following formulae: $Li_aA_{1-b}B_bD_2$ where $0.90 \le a \le 1.8$ and $0 \le b \le 0$; $Li_aE_{1-b}B_bO_{2-c}D_c$ where $0.90 \le a \le 1.8$, $0 \le b \le 0.5$, and $0 \le c \le 0.05$; $LiE_{2-b}B_bO_{4-c}D_c$ where $0 \le b \le 0.5$ and $0 \le c \le 0.05$; $Li_aNi_{1-b-c}Co_bB_cD_\alpha$ where $0.90 \le a \le 1.8$, $0 \le b \le 0.5$, $0 \le c \le 0.05$, and $0 < \alpha \le 2$; $Li_aNi_{1-b-c}Co_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Co_bB_cO_{2-\alpha}F_2$ where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ where $0.90 \le a \le 1.8$, $0 \le b \le 0.5$, $0 \le c \le 0.05$, and $0 < \alpha \le 2$; $Li_aNi_{1-b-c}Mn_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Mn_bB_cO_{2-\alpha}F_2$ where $0.90 \le a \le 1.8$, $0 \le b \le 0.5$, $0 \le c \le 0.05$, and $0 < \alpha < 2$; $Li_aN$-$i_bE_cG_dO_2$ where $0.90 \le a \le 1.8$, $0 \le b \le 0.9$, $0 \le c \le 0.5$, and $0.001 \le d \le 0.1$; $Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.8$ and $0.001 \le b \le 0.1$; $Li_aCoG_bO_2$ where $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ where $0.90 \le a \le 1.8$ and $0.001 \le b \le 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \le f \le 2$; $Li_{(3-f)}Fe_2(PO_4)_3$ where $0 \le f \le 2$; and $LiFePO_4$.

In the formulae above, A may be selected from nickel (Ni), cobalt (Co), manganese (Mn), and a combination thereof; B may be selected from aluminum (Al), Ni, Co, Mn, chromium (Cr), iron (Fe), magnesium (Mg), strontium (Sr), vanadium (V), a rare earth element, and a combination thereof; D may be selected from oxygen (O), fluorine (F), sulfur (S), phosphorus (P), and a combination thereof; E may be selected from Co, Mn, and a combination thereof; F may be selected from F, S, P, and a combination thereof; G may be selected from Al, Cr, Mn, Fe, Mg, lanthanum (La), cerium (Ce), Sr, V, and a combination thereof; Q is selected from titanium (Ti), molybdenum (Mo), Mn, and a combination thereof; I is selected from Cr, V, Fe, scandium (Sc), yttrium (Y), and a combination thereof; and J may be selected from V, Cr, Mn, Co, nickel (Ni), copper (Cu), and a combination thereof.

The positive active material may be, for example, a composite further having a coating layer on a surface of the above-listed compound, or a mixture of the above-listed compound and a compound having a coating layer. The coating layer may include a coating element compound, such as an oxide or hydroxide of a coating element, an oxyhydroxide of a coating element, an oxycarbonate of a coating element, or a hydroxycarbonate of a coating element. These compounds constituting the coating layers may be amorphous or crystalline. The coating element included in the coating layer may be, for example, Mg, Al, Co, potassium (K), sodium (Na), calcium (Ca), Si, Ti, V, Sn, germanium (Ge), gallium (Ga), boron (B), arsenic (As), zirconium (Zr), or a mixture thereof. A coating layer may be formed using the aforementioned compounds and the coating elements constituting the compounds of the coating layers by using any one of various coating methods that do not adversely affect physical properties of the positive active material. The coating method may be, for example, spray coating, dipping, or the like. The coating method is well understood by those of ordinary skill in the art, and thus, a detailed description thereof is omitted herein.

For example, the positive active material may be $LiNiO_2$, $LiCoO_2$, $LiMn_xO_{2x}$ where x=1 or 2, $LiNi_{1-x}Mn_xO_2$ where $0<x<1$, $LiNi_{1-x-y}Co_xMn_yO_2$ where $0 \le x \le 0.5$ and $0 \le y \le 0.5$, $LiFePO_4$, or the like.

The above-described separator is arranged between the positive electrode and the negative electrode.

Any suitable electrolyte can be used. The electrolyte may be, for example, an organic electrolyte solution. In some embodiments, the electrolyte may be a solid electrolyte. For example, the solid electrolyte may be boron oxide, lithium oxynitride, or the like, but the present disclosure is not limited to the above examples. That is, any solid electrolyte used in the art may be used. The solid electrolyte may be formed on the negative electrode by, for example, sputtering, atomic layer deposition (ALD), chemical vapor deposition (CVD), physical vapor deposition (PVD), or any method known in the art.

For example, an organic electrolyte solution is prepared. The organic electrolyte solution may be prepared by dissolving a lithium salt in an organic solvent.

The organic solvent may be any solvent that may be used as an organic solvent in the art. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, a mixture thereof, or the like.

The lithium salt may be any material that may be used as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, a mixture thereof, or the like.

Figure 5:
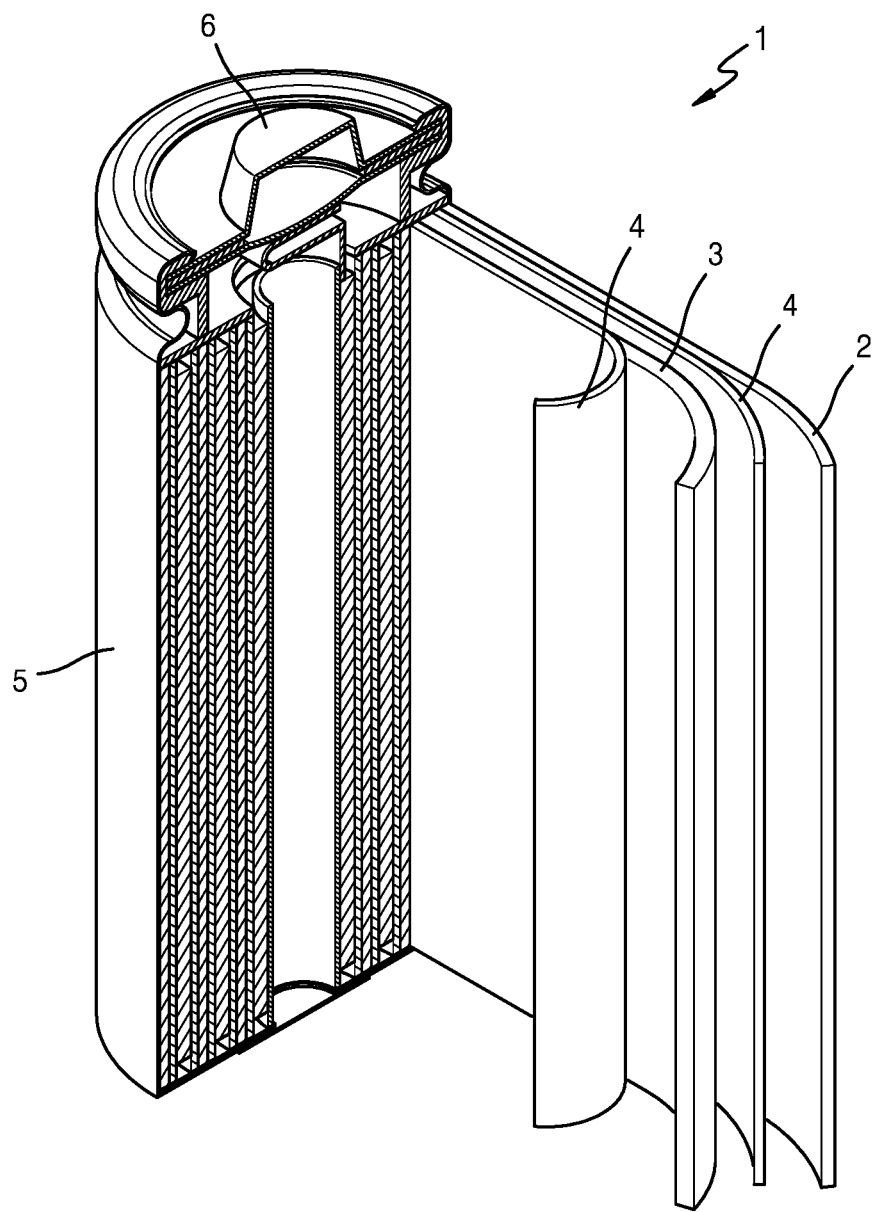
FIG. 5 is a schematic view of a lithium battery according to an embodiment.

Referring to FIG. 5, a lithium battery 1 includes a positive electrode 3, a negative electrode 2, and a separator 4. The positive electrode 3, the negative electrode 2, and the separator 4 are wound or folded to be accommodated in a battery case 5. Subsequently, an organic electrolyte solution is injected into the battery case 5 and the battery case 5 is sealed with a cap assembly 6 to thereby complete the manufacture of the lithium battery 1. The battery case 5 may be of a cylindrical type, a rectangular type, a pouch type, a coin type, or the like. The lithium battery 1 may be, for example, a thin-film type battery. The lithium battery 1 may be, for example, a lithium ion battery.

The separator is arranged between the positive electrode and the negative electrode to thereby form a battery assembly. A plurality of battery assemblies may be stacked in a bi-cell structure, and then impregnated with an organic electrolyte solution, and the obtained resulting structure is accommodated in a pouch and sealed, thereby completing the manufacture of a lithium-ion polymer battery.

A battery assembly or a plurality of battery assemblies form a battery module, and a plurality of battery modules are stacked to form a battery pack. The battery pack may be used in any device that requires high capacity and high output. For example, the battery pack may be used in a laptop computer, a smartphone, an electric vehicle, or the like.

The lithium battery has excellent rate capability and excellent lifespan characteristics, and is thus suitable for use in electric vehicles (EVs). For example, the lithium battery is suitable for use in hybrid vehicles such as plug-in hybrid electric vehicles (PHEVs) and the like.

A method of preparing a porous film, according to another embodiment, includes applying a composition comprising paper mulberry pulp cellulose nanofibers and a hydrophilic pore-forming agent on a substrate; drying the second composition to form a sheet on the substrate; and separating the sheet from the substrate to obtain a porous film consisting of the sheet. The method can further comprise providing the composition to be applied to the substrate by preparing a first composition including paper mulberry pulp cellulose nanofibers; and combining the first composition with a hydrophilic pore-forming agent to provide a second composition, which second composition is applied to the substrate According to one embodiment, in the porous film preparation method, the composition applied to the substrate (e.g., the first composition used to prepare the composition to be applied to the substrate) further includes cellulose nanofibers different from paper mulberry pulp cellulose nanofibers. The cellulose nanofibers different from paper mulberry pulp cellulose nanofibers may be, for example, plant cellulose nanofibers, animal cellulose nanofibers, and/or microbial or bacterial cellulose nanofibers.

According to one embodiment, in the porous film preparation method, the composition applied to the substrate (e.g., the second composition used to prepare the composition to be applied to the substrate) further includes at least one selected from a cross-linking agent and a binder. Inclusion of a cross-linking agent and/or a binder in the second composition further confers enhanced tensile strength on the porous film. The types of the cross-linking agent and the binder are the same as those described above included in the above-described porous film.

The hydrophilic pore-forming agent may be at least one selected from: pore-forming agents in a solid state at room temperature such as polyethylene glycol, ethylene carbonate, propylene carbonate, vinylene carbonate, propanesulfone, ethylenesulfate, dimethylsulfone, ethyl methyl sulfone, dipropyl sulfone, dibutyl sulfone, trimethylene sulfone, tetramethylene sulfone, di(methoxyethyl)sulfone ($CH_3OCH_2CH_2)_2SO_2$), and ethyl cyclopentyl sulfone ($C_2H_5SO_2C_5H_9$); and pore-forming agents in a liquid state at room temperature such as 1,5-pentanediol, 1-methylamino-2,3-propanediol, ε-caprolactone, γ-butyrolactone, α-acetyl-γ-butyrolactone, diethylene glycol, 1,3-butylene glycol, propylene glycol, triethylene glycol dimethyl ether, tripropylene glycol dimethyl ether, diethylene glycol monobutyl ether, triethylene glycol monomethyl ether, triethylene glycol butyl methyl ether, tetraethylene glycol dimethyl ether, diethylene glycol monoethyl ether acetate, diethylene glycol monoethyl ether, triethylene glycol monobutyl ether, tetraethylene glycol monobutyl ether, dipropylene glycol monomethyl ether, diethylene glycol monomethyl ether, diethylene glycol monoisopropyl ether, ethylene glycol monoisobutyl ether, tripropylene glycol monomethyl ether, diethylene glycol methyl ethyl ether, diethylene glycol diethyl ether, glycerin, propylene carbonate, and N-methylpyrrolidone. However, the present disclosure is not limited to the above examples, and any pore-forming agent used in the art may be used.

In a case in which the hydrophilic pore-forming agent in a solid state is used at room temperature, the content of water decreases as the water evaporates from the composition, such that an amount of the residual pore-forming agent exceeds the solubility of the pore-forming agent in water; pore-forming agents in a solid state at room temperature are precipitated from water and distributed and disposed within a sheet in a solid state; and thus, additional agglomeration or a rearrangement of the precipitated pore-forming agent, which is already distributed within the sheet, due to additional evaporation of water is suppressed. Thus, the pore size and pore distribution uniformity of the porous film are further enhanced.

The method of preparing a porous film, according to an embodiment, further includes washing the sheet or the porous film with an organic solvent. By washing the sheet or the porous film with an organic solvent, the pore-forming agent remaining in the sheet or the porous film is effectively removed. The washing method and the number of washing operations are not limited and the washing process may be performed once or more to adjust physical properties of the porous film. The organic solvent used to wash the sheet or the porous film may be any organic solvent used in the art that is capable of dissolving a hydrophilic pore-forming agent in a solid state at room temperature. For example, toluene is used as the organic solvent. After removing the hydrophilic pore-forming agent using the organic solvent in the porous film preparation method, the temperature and time for drying the washed porous film are not particularly limited, but the porous film may be dried, for example, at a temperature between about 20° C. and about 120° C. for about 1 minute to about 10 hours. The drying process is performed at atmospheric pressure or in a vacuum oven.

In the porous film preparation method, the first composition and the second composition include water as a solvent, but the present disclosure is not necessarily limited thereto. In some embodiments, the first composition and the second composition further include, in addition to water, other solvents capable of dissolving cellulose nanofibers and a hydrophilic pore-forming agent in a solid state at room temperature.

In the porous film preparation method, the amount of the cellulose nanofibers included in the first composition and/or the second composition ranges from, for example, about 0.01 wt % to about 50 wt %, about 0.05 wt % to about 40 wt %, about 0.1 wt % to about 30 wt %, about 0.2 wt % to about 20 wt %, about 0.3 wt % to about 15 wt %, about 0.3 wt % to about 10 wt %, about 0.35 wt % to about 8 wt %, about 0.4 wt % to about 6 wt %, or about 0.4 wt % to about 5 wt %, with respect to a total weight of the composition(s). When the amount of the cellulose nanofibers is too small, an excessively large amount of time is consumed in drying or the like, productivity is reduced, and the tensile strength of the porous film is reduced. When the amount of the cellulose nanofibers is too large, the viscosity of the composition is excessively increased, and thus it is difficult to obtain a uniform sheet.

In the porous film preparation method, the amount of the hydrophilic pore-forming agent included in the first composition and/or the second composition ranges from, for example, about 1 wt % to about 50 wt %, about 2 wt % to about 40 wt %, about 3 wt % to about 30 wt %, about 4 wt % to about 20 wt %, about 5 wt % to about 15 wt %, about 6 wt % to about 14 wt %, about 7 wt % to about 13 wt %, about 8 wt % to about 12 wt %, or about 9 wt % to about 11 wt %, with respect to a total weight of the composition(s). When the amount of the hydrophilic pore-forming agent is too small, the porosity of the obtained porous film is less than 10%. When the amount of the hydrophilic pore-forming agent is too large, the porosity of the obtained porous film is excessively increased, and thus when the porous film is used as a separator of a lithium battery, a short circuit occurs and, accordingly, the stability of a lithium battery including the porous film is deteriorated.

In the porous film preparation method, a drying temperature of water is not particularly limited, but the drying process is performed at a temperature between about 50° C. and about 120° C. for about 1 minute to about 10 hours. The drying process is performed at atmospheric pressure or in a vacuum oven.

Hereinafter, the present disclosure will be described in further detail with reference to the following examples and comparative examples. However, these examples are provided for illustrative purposes only and are not intended to limit the scope of the present disclosure.

(Preparation of Cellulose Nanofibers)

PREPARATION EXAMPLE 1

Preparation of Paper Mulberry Pulp Nanofibers

A paper mulberry pulp fiber slurry (manufactured by Ilsinhangi, Korea) was added to distilled water and mixed therein to prepare a 0.1 wt % paper mulberry pulp fiber suspension.

The prepared suspension was homogenized using a general homogenizer (DAIHAN Scientific Co., Ltd.: Homogenizer HG-15A, Korea) to prepare 500 ml of a homogenized suspension of 0.5 wt % (w/w) of paper mulberry pulp cellulose nanofibers.

Subsequently, the homogenized suspension was allowed to pass four times through a microchannel (Interaction chamber, size: 200 μm) of a Nano Disperser (Ilshin Autoclave, ISA-NH500, Korea), which is a high-pressure homogenizer, in a state in which 150 bar was applied thereto, to thereby obtain a suspension including high-pressure homogenized paper mulberry pulp cellulose nanofibers. The suspension including high-pressure homogenized paper mulberry pulp cellulose nanofibers was centrifuged to obtain a cellulose precipitate.

Subsequently, the obtained precipitate was homogenized again using a general homogenizer (DAIHAN Scientific Co., Ltd.: Homogenizer HG-15A, Korea) to prepare 500 ml of a homogenized suspension of 0.5 wt % (w/w) of paper mulberry pulp nanofibers.

Since there are wider spaces than the microchannel in the front and rear sides of the microchannel of the high-pressure homogenizer, while a fermentation liquid moves from the narrow microchannel to the wider space, the fermentation liquid is homogenized by a high-velocity decelerating impact due to a pressure drop and high velocity shearing.

PREPARATION EXAMPLE 2

Preparation of Carboxyl Group-Containing Microbial or Bacterial Cellulose Nanofibers A wild-type *Gluconacetobacter xylinum* strain (KCCM 41431) was placed in 700 ml of a Hestrin-Schramm (HS) medium supplemented with 1.0 w/v % carboxymethylcellulose (CMS) (Na-CMC, SIGMA) having a molecular weight of 250,000 Daltons in a 1 L fermenter (Hanil Science Industry Corporation, GX LiFlus Series Jar-type open system, positive pressure maintained to prevent contamination), and cultured at 30° C. for 48 hours while being stirred at 200 rpm using an impeller. The HS medium contained 20 g/L of glucose, 5 g/L of bacto-peptone, 5 g/L of a yeast extract, 2.7 g/L of $Na_2HPO_4$, and 1.15 g/L of citric acid, in water.

A dispersion in which carboxyl group-containing cellulose nanofibers were uniformly dispersed, produced as a result of culturing, for example, a fermentation solution including a paste, was collected, rinsed three times with distilled water, and heated at 121° C. in a 2% aqueous NaOH solution to hydrolyze cells and impurities present between the carboxyl group-containing cellulose nanofibers, followed by rinsing with distilled water, thereby obtaining purified carboxyl group-containing cellulose nanofibers. The purified carboxyl group-containing cellulose nanofibers were mixed with water to prepare 0.5 wt % of a carboxyl group-containing cellulose nanofiber suspension. The prepared suspension was homogenized using a general homogenizer (DAIHAN Scientific Co., Ltd.: Homogenizer HG-15A, Korea) to prepare 500 ml of a homogenized suspension of 0.5 wt % (w/w) of carboxyl group-containing cellulose nanofiber.

Subsequently, the homogenized fermentation solution was allowed to pass once through a microchannel (Interaction chamber, size: 200 μm) of a Nano Disperser (Ilshin Autoclave, ISA-NH500, Korea), which is a high-pressure homogenizer, in a state in which 300 bar was applied thereto, to thereby obtain a high-pressure homogenized fermentation solution including carboxyl group-containing cellulose nanofibers. The high-pressure homogenized fermentation solution including carboxyl group-containing cellulose nanofibers was centrifuged to obtain a cellulose precipitate. The obtained precipitate was heated at 121° C. in a 2% aqueous NaOH solution for 15 minutes to hydrolyze cells and impurities present between the carboxyl group-containing cellulose nanofibers, followed by rinsing with distilled water, thereby obtaining purified carboxyl group-containing cellulose nanofibers.

The prepared carboxyl group-containing cellulose nanofibers had an average diameter of 18 nm, the content of carboxyl groups was 0.11 mmol/g, and a weight average degree of polymerization thereof was 5531 DPw.

COMPARATIVE PREPARATION EXAMPLE 1

Preparation of Paper Mulberry Pulp Suspension

A paper mulberry pulp fiber slurry (manufactured by Ilsinhangi, Korea) was added to distilled water and mixed therein to prepare a 0.1 wt % paper mulberry pulp fiber suspension.

The prepared suspension was homogenized using a general homogenizer (DAIHAN Scientific Co., Ltd.: Homogenizer HG-15A, Korea) to prepare 500 ml of a homogenized suspension of 0.5 wt % (w/w) of paper mulberry pulp cellulose nanofibers.

COMPARATIVE PREPARATION EXAMPLE 2

Preparation of Wood-based Cellulose Nanofibers

Wood-based cellulose nanofibers (manufactured by Sugino, Japan, WMa-10002) were purchased and directly used.

(Preparation of Porous Film)

EXAMPLE 1

Paper Mulberry Pulp Cellulose Nanofibers (CNFs)

0.423 g of polyethylene glycol (PEG) (Mn=1,000) as a pore-forming agent was added to 30 ml of a 0.5 wt % dispersion in which the paper mulberry pulp cellulose nanofibers prepared according to Preparation Example 1 were diluted with water, and the resulting solution was stirred at 1,000 rpm and at room temperature for 1 hour. The obtained composition was poured into a 10 cm-diameter petri dish and dried at 90° C. for 2 hours to remove water, thereby obtaining a paper mulberry pulp cellulose nanofiber film. The paper mulberry pulp cellulose nanofiber film was dipped in toluene and then washed four to five times to remove the PEG, followed by drying at room temperature for 4 hours, thereby obtaining a porous film. The obtained porous film was not a woven film, but non-woven fabric.

The obtained porous film was used as a separator as it was.

EXAMPLE 2

Paper Mulberry Pulp CNF+Microbial CNF 0.423 g of PEG (Mn=1,000) as a pore-forming agent was added to 30 ml of a 0.5 wt % dispersion in which a mixture of the paper mulberry pulp cellulose nanofibers of Preparation Example 1 and carboxyl group-containing cellulose nanofibers prepared according to Preparation Example 2 in a weight ratio of 1:1 was diluted with water, and the resulting solution was stirred at 1,000 rpm and at room temperature for 1 hour. The obtained composition was poured into a 10 cm-diameter petri dish and dried at 90° C. for 2 hours to remove water to thereby obtain a composite cellulose nanofiber film. The composite cellulose nanofiber film was dipped in toluene and then washed four to five times to remove the PEG, followed by drying at room temperature for 4 hours, thereby obtaining a porous film. The obtained porous film was not a woven film, but non-woven fabric.

The obtained porous film was used as a separator as it was.

COMPARATIVE EXAMPLE 1

Paper Mulberry Pulp Suspension 150 g of the paper mulberry pulp suspension prepared according to Comparative Preparation EXAMPLE 1 was poured into a 50 cm-diameter petri dish and dried at 70° C. for 9 hours to remove water, thereby obtaining a paper mulberry pulp porous film. The obtained porous film was not a woven film, but non-woven fabric.

COMPARATIVE EXAMPLE 2

Wood-Based CNF 0.423 g of PEG (Mn=1,000) as a pore-forming agent was added to 30 ml of a 0.5 wt % dispersion in which the wood-based cellulose nanofibers prepared according to Comparative Preparation Example 2 were diluted with water, and the resulting solution was stirred at 1,000 rpm and at room temperature for 1 hour. The obtained composition was poured into a 10 cm-diameter petri dish and dried at 90° C. for 2 hours to remove water, thereby obtaining a wood-based cellulose nanofiber film. The paper mulberry pulp cellulose nanofiber film was dipped in toluene and then washed four to five times to remove the PEG, followed by drying at room temperature for 4 hours, thereby obtaining a porous film. The obtained porous film was not a woven film, but non-woven fabric.

The obtained porous film was used as a separator as it was.

(Manufacture of Lithium Battery)

EXAMPLE 3

(Manufacture of Positive Electrode)

A mixture prepared by mixing $LiNi_{0.6}Co_{0.2}Al_{0.2}O_2$ as a positive active material, Denka Black as a carbon conductive material, and polyvinylidene fluoride (PVdF) in a weight ratio of 94:3:3 was mixed with N-methylpyrrolidone (NMP) in an agate mortar to prepare a positive active material slurry. The positive active material slurry was applied onto an aluminum (Al) current collector having a thickness of 15 μm by using a doctor blade to a thickness of about 40 μm, followed by drying at room temperature, further drying in a vacuum at 120° C., and roll pressing, thereby manufacturing a positive electrode in which a positive active material layer was arranged on a the current collector.

(Manufacture of Negative Electrode)

Graphite particles having an average particle diameter of 25 μm, styrene-butadiene rubber (SBR) as a binder (Zeon), and carboxymethylcellulose (CMC) (NIPPON A&L) were mixed in a weight ratio of 97:1.5:1.5, distilled water was then added thereto, and the resulting solution was stirred using a mechanical stirrer for 60 minutes, thereby preparing a negative active material slurry. The slurry was applied to a thickness of about 60 μm onto a copper (Cu) current collector having a thickness of 10 μm by using a doctor blade, followed by drying in a hot air dryer at 100° C. for 0.5 hours, further drying at 120° C. for 4 hours, and roll pressing, thereby completing the fabrication of a negative electrode plate.

(Manufacture of Lithium Battery)

The porous film prepared according to Example 1 was used as a separator.

The porous film of Example 1 was arranged between the positive electrode and the negative electrode, and then the resulting structure was accommodated in a pouch and an electrolyte solution was injected thereinto, followed by sealing, thereby completing the manufacture of a pouch cell.

As an electrolyte, an electrolyte prepared by dissolving 1.15 M $LiPF_6$ in a mixed solution of ethylene carbonate (EC): ethyl methyl carbonate (EMC): dimethyl carbonate (DMC) in a volume ratio of 2:2:6 was used.

EXAMPLE 4

A pouch cell was manufactured in the same manner as in Example 3, except that the porous film of Example 2 was used as a separator instead of the porous film of Example 1.

COMPARATIVE EXAMPLE 3

A pouch cell was manufactured in the same manner as in Example 3, except that the porous film prepared according to Comparative Example 1 was used as a separator instead of the porous film of Example 1.

COMPARATIVE EXAMPLE 4

A pouch cell was manufactured in the same manner as in Example 3, except that the porous film prepared according to Comparative Example 2 was used as a separator instead of the porous film of Example 1.

EVALUATION EXAMPLE 1

Measurement of Tensile Properties of Porous Film

Tensile modulus and tensile strength, which is stress at break of specimens (area: 15 mm×50 mm) of the porous films of Examples 1 and 2 and Comparative Example 2, were measured using a texture analyzer (TA.XT plus, Stable Micro Systems) with a stress-strain curve obtained by stretching the samples at a rate of 5 mm/min. Measurement results thereof are shown in Table 1 below.

EVALUATION EXAMPLE 2

Measurement of Thickness and Gurley Value of Porous Film

Thicknesses and Gurley values (air permeability) of specimens (area: 50 mm×50 mm) of the porous films of Examples 1 and 2 and Comparative Example 2 were measured.

The thickness of the specimen of each separator having an area of 15 mm×50 mm was measured at five positions thereof using TM600 as a thickness measurer (manufactured by Kumagai Riki Industry Co., Ltd), and an average of the thicknesses was denoted as the thickness of each porous film.

The Gurley value, i.e., air permeability of each porous film was measured using a permeability test device (manufactured by E-Globaledge, EGO-1-55-1MR, Oken Type Air Permeability Tester) in accordance with JIS P8117. The Gurley value refers to a time (sec) value taken for 100 cc of air to pass through a porous film. When air smoothly passes through the porous film, the Gurley value is decreased.

Some of the measurement results are shown in Table 1 below.

EVALUATION EXAMPLE 3

Measurement of Heat Shrinkage Rate of Porous Film

The specimen (area: 50 mm×50 mm) of the porous film of Example 1 was exposed to 150° C. for 30 minutes. Thicknesses of the porous film before and after exposure to 150° C. were measured and heat shrinkage rates thereof were calculated. The heat shrinkage rate was calculated by Equation 1 below. Some of the measurement results are shown in Table 1 below.

Heat shrinkage rate (%)=[(thickness of porous film before exposure−thickness of porous film after exposure)/thickness of porous film before exposure]×100  <Equation 1>

TABLE 1

| | Tensile strength [kgf/cm$^2$] | Thickness [μm] | Gurley value [sec/100 cc] | Heat shrinkage rate [%] |
|---|---|---|---|---|
| Example 1 | 57 | 47 | 86 | Less than 1% |
| Example 2 | 459 | 13 | 376 | — |
| Comparative Example 2 | 374 | 15 | 43 | — |

Table 1 shows the tensile strength, thickness, porosity, Gurley value, and heat shrinkage rate of each of the porous films of Examples 1 and 2 and Comparative Example 2.

EVALUATION EXAMPLE 4

X-Ray Diffraction (XRD) Measurement

XRD spectra of the porous films of Examples 1 and 2 and Comparative Examples 1 and 2 were measured using CuKα radiation produced at 45 kV and 36 mA, and from peak intensity $I_{AM}$ of an amorphous phase obtained in the vicinity of a scattering angle of 19° and total peak intensity $I_{002}$ of a (002) crystal plane obtained in the vicinity of a scattering angle of 22°, a crystalline index, i.e., an intensity ratio (($I_{002}$-$I_{AM}$)/$I_{002}$) of crystalline peak intensity ($I_{002}$-$I_{AM}$), which is a difference between the total peak intensity $I_{002}$ of the (002) crystal plane and the peak intensity $I_{AM}$ of amorphous phase, divided by the total peak intensity 1002 of the (002) crystal plane, was evaluated. The measurement results thereof are shown in Table 2 below and FIG. 2

TABLE 2

| | Crystalline index [($I_{002}$ − $I_{AM}$)/$I_{002}$] |
|---|---|
| Example 1 | 0.80 |
| Example 2 | 0.84 |
| Comparative Example 1 | 0.90 |
| Comparative Example 2 | 0.78 |

Figure 2:
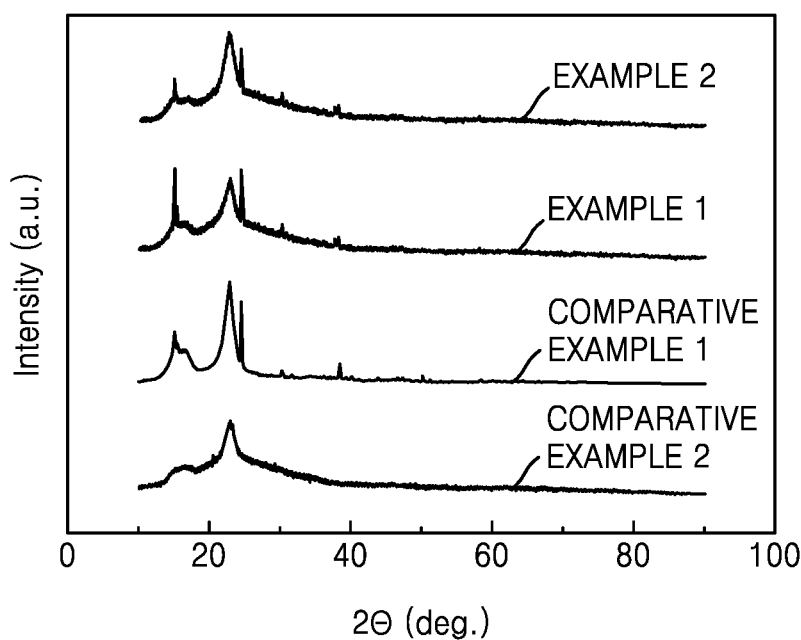
FIG. 2 illustrates X-ray diffraction (XRD) spectra of the porous films of Examples 1 and 2 and a porous film prepared according to Comparative Example 2.

As shown in Table 2 and FIG. 2, the crystalline indexes of the porous films of Examples 1 and 2 ranged from 0.8 to less than 0.9, whereas the crystalline indexes of the porous films of Comparative Examples 1 and 2 were outside the above range.

EVALUATION EXAMPLE 5

Measurement of Differential Scanning Calorimetry (DSC) of Porous Film

Measurement of a DSC thermogram was performed on each of the porous films of Examples 1 and 2 and Comparative Example 2 from 30° C. to 300° C., and results thereof are shown in FIG. 1.

In addition, a calorific value of each of the porous films of Examples 1 and 2 and Comparative Examples 1 and 2 (impregnated with an electrolyte solution prepared by dissolving 1.15M LiPF$_6$ in a mixed solution of EC: EMC: DMC in a volume ratio of 2:4:4) was measured under the same condition, and results thereof are shown in Table 3 below and FIG. 1. In Table 3, the data indicates a difference in calorific value between porous films not impregnated with the electrolyte solution compared to those films impregnated with the electrolyte solution.

TABLE 3

| | Calorific value [J/g] |
|---|---|
| Example 1 | 47 |
| Example 2 | 144 |
| Comparative Example 2 | 203 |

As shown in Table 3 and FIG. 1, the incidence of side reactions between the porous films of Examples 1 and 2 and the electrolyte solution was significantly reduced compared to that of the porous film of Comparative Example 2.

In addition, the porous film of Example 1 exhibited a decreased incidence of side reactions with the electrolyte solution compared to that of the porous film of Example 2.

In addition, as illustrated in FIG. 1, the porous film of Example 1 did not exhibit an exothermic peak at a temperature between 250° C. and 300° C.

EVALUATION EXAMPLE 6

Evaluation of Charge/Discharge Characteristics

Each of the lithium batteries (pouch cells) manufactured according to Examples 3 and 4 and Comparative Example 3 was charged at a constant current of 0.1 C rate at 25° C. until the voltage reached 4.2 V (vs. Li), and charged at a constant voltage maintained at 4.2 V until the current reached 0.01 C. The completely charged lithium batteries were rested for 10 minutes, and then each lithium battery was discharged at a constant current of 0.1 C until the voltage reached 2.8 V (vs. Li) (1$^{st}$ cycle).

Subsequently, each lithium battery was charged at a constant current of 0.2 C rate until the voltage reached 4.2 V (vs. Li), and charged at a constant voltage maintained at 4.2 V until the current reached 0.01 C. The completely charged lithium batteries were rested for 10 minutes, and then each lithium battery was discharged at a constant current of 0.2 C until the voltage reached 2.8 V (vs. Li) (2$^{nd}$ cycle) (1$^{st}$ and 2$^{nd}$ cycles are formation processes).

Each pouch cell having gone through the formation processes was charged at a constant current of 1.0 C rate at 25° C. until the voltage reached 4.2 V (vs. Li), and charged at a constant voltage maintained at 4.2 V until the current reached 0.01 C. The completely charged lithium batteries were rested for 10 minutes, and then each lithium battery was discharged at a constant current of 0.1 C until the voltage reached 2.8 V (vs. Li) (0.1 C cycle).

Subsequently, each pouch cell was charged at a constant current of 1.0 C rate at 25° C. until the voltage reached 4.2 V (vs. Li), and charged at a constant voltage maintained at 4.2 V until the current reached 0.01 C. The completely charged lithium batteries were rested for 10 minutes, and then each lithium battery was discharged at a constant current of 0.2 C until the voltage reached 2.8 V (vs. Li) (0.2 C cycle).

Each pouch cell having gone through the formation processes was charged at a constant current of 1.0 C rate at 25° C. until the voltage reached 4.2 V (vs. Li), and charged at a constant voltage maintained at 4.2 V until the current reached 0.01 C. The completely charged lithium batteries were rested for 10 minutes, and then each lithium battery was discharged at a constant current of 0.5 C until the voltage reached 2.8 V (vs. Li) (0.5 C cycle).

Subsequently, each pouch cell having gone through the 0.5 C cycle was charged at a constant current of 1.0 C rate at 25° C. until the voltage reached 4.2 V (vs. Li), and charged at a constant voltage maintained at 4.2 V until the current reached 0.01 C. The completely charged lithium batteries were rested for 10 minutes, and then each lithium battery was discharged at a constant current of 1.0 C until the voltage reached 2.8 V (vs. Li). This cycle of charging and discharging was repeated a total of 300 times. Some of the charging/discharging experimental results is shown in FIGS. 4A to 4C.

A capacity retention of each lithium battery was calculated by Equation 2 below:

$$\text{Capacity retention [\%]} = [\text{discharge capacity at } 300^{th} \text{ cycle/discharge capacity at } 1^{st} \text{ cycle}] \times 100 \quad \text{<Equation 2>}$$

Figure 4A:
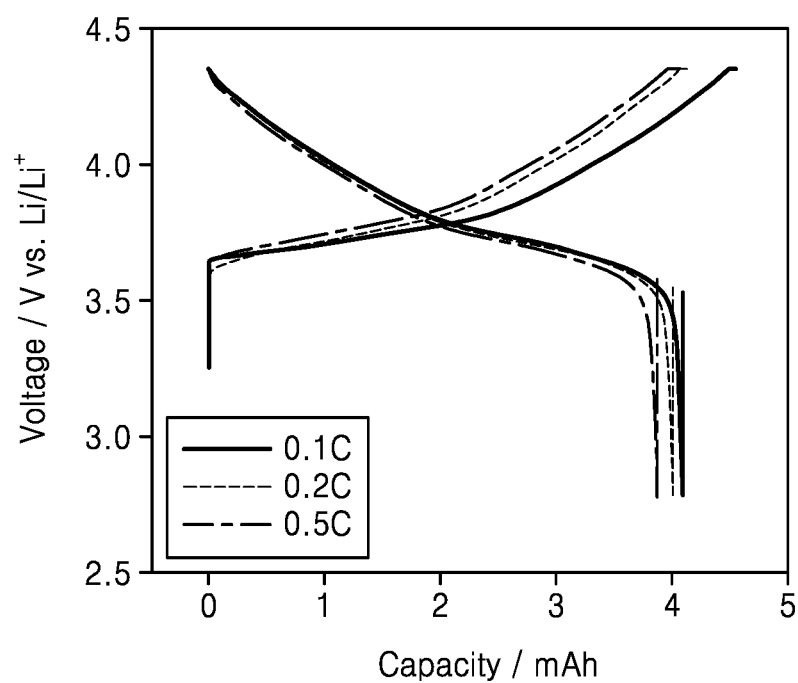
FIG. 4A is a graph showing charge/discharge profiles of a lithium battery manufactured according to Example 3.
Figure 4B:
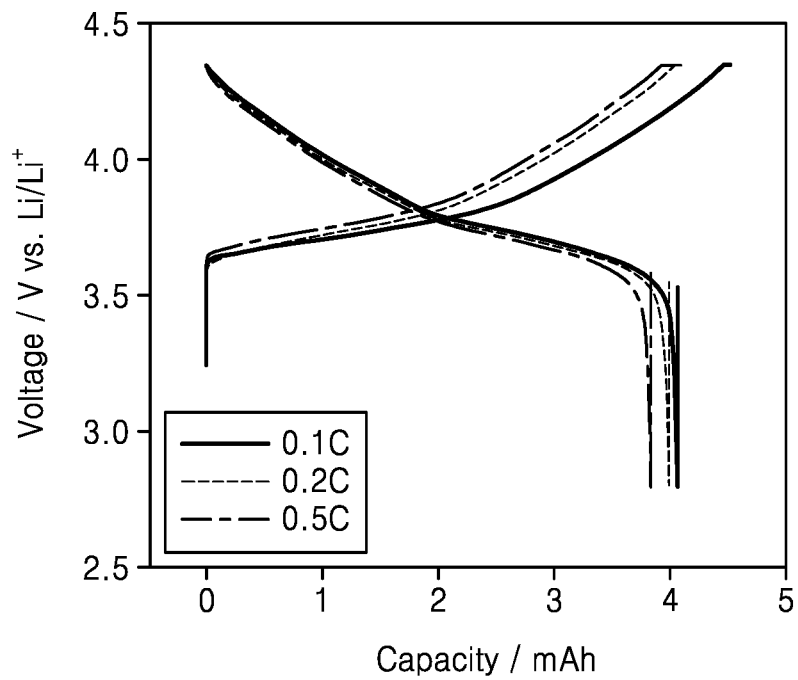
FIG. 4B is a graph showing charge/discharge profiles of a lithium battery manufactured according to Example 4.
Figure 4C:
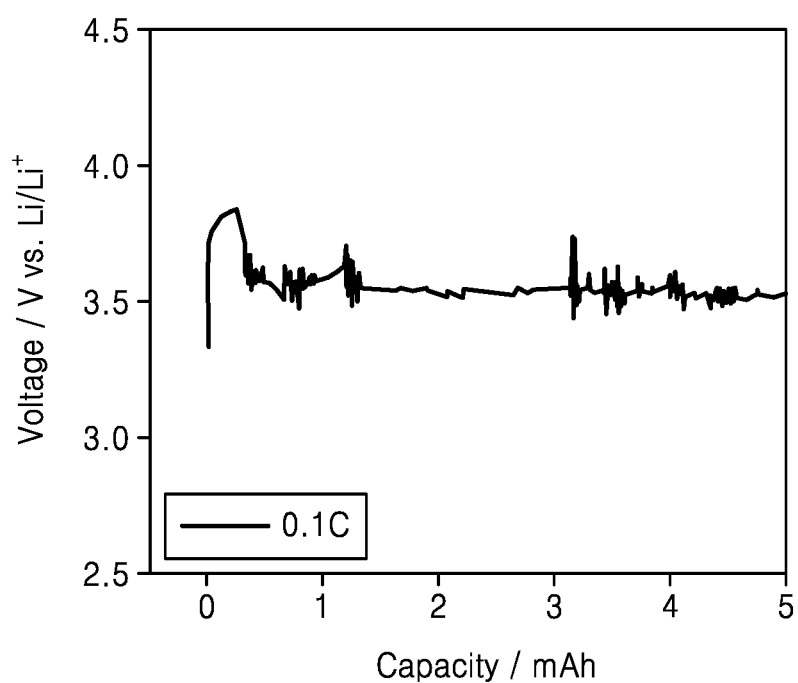
FIG. 4C is a graph showing a charge/discharge profile of a lithium battery manufactured according to Comparative Example 4.

As illustrated in FIGS. 4A to 4C, the lithium batteries of Example 3 (see FIG. 4A) and Example 4 (see FIG. 4B) including the porous films of Examples 1 and 2, respectively as separators, realized reversible charging/discharging at various C rates. Further, the lithium batteries of Example 3 and Example 4 shows good capacity retention.

However, the lithium battery of Comparative Example 3 (see FIG. 4C) could not be charged and discharged, and thus did not operate as a lithium battery.

EVALUATION EXAMPLE 7

Measurement of Whether Carboxyl Group was Present

The presence or absence of a carboxyl group was evaluated by measuring an IR spectrum of the cellulose nanofibers prepared according to Preparation Example 2.

In the cellulose nanofibers of Preparation Example 2, a peak appeared in the vicinity of 1,572 cm$^{-1}$ corresponding to a carboxyl group, from which it was confirmed that a carboxyl group was included therein.

EVALUATION EXAMPLE 8

Measurement of Carboxyl Group Content

The carboxyl group content of the cellulose nanofibers of Preparation Example 2 was measured, and the results thereof are shown in Table 4 below. The carboxyl group content may be measured by any one of electrical conductivity titration and ion chromatography, but a combination of these methods was used herein to increase accuracy.

1. Electrical Conductivity Titration

The carboxyl group content was measured by electrical conductivity titration (Metrohm). 0.05 g of the cellulose nanofibers (CNFs) of Preparation Example 2 that were freeze-dried, 27 ml of distilled water, and 3 ml of 0.01 M NaCl were added to a 100 ml beaker, and the pH of the resulting solution was adjusted with 0.1 M HCl to pH 3 or less. Subsequently, 0.2 ml of a 0.04 M NaOH solution was added dropwise to the beaker until pH reached 10.5, and from a conductivity and pH curve, the carboxyl group content was calculated by Equation 3 below. The measurement results thereof are shown in Table 4 below.

$$\text{Carboxyl group content(mmol/g)} = [0.04\text{M} \times \text{volume of dropwise-added NaOH(mL)}]/0.05\text{g} \quad \text{<Equation 3>}$$

2. Ion Chromatography 5 ml of 12 mM HCl was added to 0.015 g of the cellulose nanofibers (CNFs) of Preparation Example 2 that were freeze-dried, followed by sonication for 1 hour. After maintaining the resulting solution at room temperature for 15 hours, the content of Na$^+$ in the solution was analyzed by ion chromatography and the carboxyl group content was calculated from the content of Na$^+$ using Equation 4 below:

$$\text{Carboxyl group content(mmol/g)} = [\text{mmol of Na}^+]/0.015\text{g} \quad \text{<Equation 4>}$$

EVALUATION EXAMPLE 9

Measurement of Average Diameter of Cellulose Nanofibers

The diameter of the cellulose nanofibers (CNFs) of Preparation Example 2 was measured such that several images of an appropriately diluted CNF solution were acquired using a transmission electron microscope (TEM) (manufactured by Titan Cubed, Super TEM), and were used to measure the diameter and length of 100 cellulose nanofibers using an image analyzer, and an average diameter and average length thereof were calculated. In addition, a full width at half maximum (FWHM) was calculated from a diameter distribution curve illustrating the number of cellulose nanofibers according to the diameter of 100 cellulose nanofibers. The measurement results thereof are shown in Table 4 below.

EVALUATION EXAMPLE 10

Measurement of Weight Average Degree of Polymerization of Cellulose Nanofibers

The degree of polymerization (DP) of the cellulose nanofibers (CNFs) of Preparation Example 2 was calculated by the degree of polymerization determined by viscosity measurement (DPv) and a weight average degree of polymerization (DPw).

5 mg of the freeze-dried CNFs was collected, and then 10 ml of pyridine and 1 ml of phenyl isocyanate were added into a 12 ml vial to induce a derivatization reaction at 100° C. for 48 hours. 2 ml of methanol was added to the sample, followed by washing twice with 100 ml of 70% methanol and washing twice with 50 ml of H$_2$O. Subsequently, the molecular weight, molecular weight distribution, and length distribution of the CNFs were measured by gel permeation chromatography (GPC). GPC was performed using a Waters 2414 refractive index detector and a Waters Alliance e2695 separation module (Milford, Mass., USA) equipped with three columns, i.e., Styragel HR2, HR4, and HMW7 columns. As an eluent, chloroform was used at a flow rate of 1.0 ml/min. The concentration of the sample was 1 mg/ml and an injection volume thereof was 20 μl. Polystyrene standards (PS) (#140) were used as references. The measurement results thereof are shown in Table 4 below.

TABLE 4

| | Carboxyl group content [mmol/g] | Average diameter [nm] | FWHM [nm] | Average weight degree of polymerization [DPw] |
|---|---|---|---|---|
| Example 1 | 0.11 | 18 | 23 | 5531 |

Referring to Table 4, it was confirmed that carboxyl group-containing cellulose nanofibers were obtained.

As is apparent from the foregoing description, according to an embodiment, a porous film including cellulose nanofibers, which is impregnated with a carbonate-based solvent-containing electrolyte solution, has a reaction heat of 150 J/g or less at a temperature between about 30° C. and about 300° C., as measured by DSC, and thus a side reaction between the porous film and the electrolyte solution is suppressed, and deterioration of a lithium battery including the porous film as a separator is suppressed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

[Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A porous film comprising cellulose nanofibers impregnated with a carbonate-based solvent-containing electrolyte solution, wherein the porous film has a reaction heat of 150 J/g or less at a temperature ranging from about 30° C. to about 300° C., the reaction heat being measured by differential scanning calorimetry (DSC), wherein the porous film comprises first cellulose nanofibers comprising paper mulberry pulp cellulose nanofibers, and second cellulose nanofibers that are different from the first cellulose nanofibers and comprise microbial or bacterial cellulose nanofibers, wherein the second cellulose nanofibers comprise carboxyl group-containing cellulose nanofibers, wherein the carboxyl group is bound to a carbon atom of a pyranose ring of the second cellulose nanofibers and is represented by Formula 1 or 2 below:

$$—R_1—O—R_2—COOM \quad \text{Formula 1}$$

$$—O—R_2—COOM \quad \text{Formula 2,}$$

wherein $R_1$ and $R_2$ are each independently a substituted or unsubstituted $C_1$-$C_{10}$ alkylene group, and M is hydrogen or an alkali metal, and wherein the porous film comprises about 10 parts by weight to about 300 parts by weight of the second cellulose nanofibers per 100 parts by weight of the first cellulose nanofibers.

2. The porous film of claim 1, wherein a DSC thermogram of the porous film does not show an exothermic peak at a temperature between about 250° C. and about 300° C.

3. The porous film of claim 1, wherein the porous film has a crystalline index of about 0.80 to less than about 0.9 as determined from an X-ray diffraction (XRD) spectrum, the crystalline index being an intensity ratio (($I_{002}$-$I_{AM}$)/$I_{002}$) of a crystalline peak intensity ($I_{002}$-$I_{AM}$) to a total peak intensity $I_{002}$ of a (002) crystal plane, wherein the crystalline peak intensity is a difference between the total peak intensity $I_{002}$ of the (002) crystal plane and a peak intensity $I_{AM}$ of an amorphous phase.

4. The porous film of claim 1, wherein the porous film has a Gurley value of about 50 sec/100 cc to about 800 sec/100 cc.

5. The porous film of claim 1, wherein the porous film has a tensile strength of 50 kgf/cm² or more.

6. The porous film of claim 1, further comprising a cross-linking agent, a binder, inorganic particles, inorganic fibers, polyamide nanofibers, a polyolefin, highly heat-resistant aramid fibers, polyimide, polyethyleneterephthalate (PET), polyacrylonitrile (PAN), and polyvinylidene fluoride (PVDF).

7. The porous film of claim 1, wherein the carboxyl group-containing cellulose nanofibers have a carboxyl group content of 0.06 mmol/g or more.

8. The porous film of claim 1, wherein the porous film has a heat shrinkage rate of 5% or less after being maintained at 150° C. for 30 minutes.

9. The porous film of claim 1, wherein the porous film has one selected from:

a single-layered structure comprising the first cellulose nanofibers and the second cellulose nanofibers;

a multi-layered structure comprising: a first layer comprising the first cellulose nanofibers; and a second layer comprising the first cellulose nanofibers and second cellulose nanofibers wherein the second layer is disposed on the first layer;

a multi-layered structure comprising: a first, layer comprising the first cellulose nanofibers; and a second layer disposed on a first surface of the first layer comprising the second cellulose nanofibers and not comprising the first cellulose nanofibers;

a multi-layered structure comprising: a first layer comprising the first cellulose nanofibers: a second layer disposed on a first surface of the first layer comprising the second cellulose nanofibers and not comprising the first cellulose nanofibers; and a third layer disposed on a second surface of the first layer and having the same composition as the second layer;

a multi-layered structure comprising: a first layer comprising the first cellulose nanofibers; a second layer disposed on a first surface of the first layer comprising the second cellulose nanofibers and not comprising the first cellulose nanofibers; and a third layer disposed on a second surface of the first layer having a composition different from that of the second layer;

a multi-layered structure comprising: a first layer comprising the second cellulose fibers and not comprising the first cellulose, nanofibers; a second layer disposed on a first surface of the first layer and comprising the first cellulose nanofibers; and a third layer disposed on a second surface of the first layer and having the same composition with the second layer;

a multi-layered structure comprising: a first layer comprising the second cellulose nanofibers and not comprising first cellulose nanofibers; a second layer disposed on a first surface of the first layer and comprising the first cellulose nanofibers; and a third layer disposed on a second surface of the first layer and having a composition different from that of the first layer; and a multi-layered structure comprising: a first layer comprising the second cellulose nanofibers and not comprising first cellulose nanofibers; a second layer disposed on a first surface of the first layer and comprising the first cellulose nanofibers; and a third layer disposed on a second surface of the first layer and having a composition different from the second layer.

10. A separator comprising the porous film of claim 1.

11. An electrochemical device comprising:
a positive electrode;
a negative electrode; and
the separator of claim 10 disposed between the positive electrode and the negative electrode.

12. The electrochemical device of claim 11, wherein the electrochemical device comprises one of a lithium battery and an electric double layer capacitor.

13. A method of manufacturing a porous film of claim 1, the method comprising:
applying onto a substrate a composition comprising first cellulose nanofibers comprising paper mulberry pulp cellulose nanofibers and a hydrophyilic pore-forming agent;
drying the composition to form a sheet on the substrate;
removing the pore forming agent; and
preparing a porous film consisting of the sheet by separating the sheet from the substrate;
wherein the composition further comprises second cellulose nanofibers different from the first cellulose nanofibers and which comprise microbial or bacterial cellulose nanofibers;
and wherein the second cellulose nanofibers comprise carboxyl group-containing cellulose nanofibers;
wherein the carboxyl group is bound to a carbon atom of a pyranose ring of the second cellulose nanofibers and is represented by Formula 1 or 2 below:

$$-R_1-O-R_2-COOM \qquad \text{Formula 1}$$

$$-O-R_2-COOM \qquad \text{Formula 2,}$$

wherein $R_1$ and $R_2$ are each independently a substituted or unsubstituted $C_1$-$C_{10}$ alkylene group, and M is hydrogen or an alkali metal.

14. The method of claim 13, wherein the composition further comprises a cross-linking agent, a binder, or a combination thereof.

15. The method of claim 13, wherein the hydrophilic pore-forming agent comprises at least one selected from the group consisting of ethylene carbonate, propylene carbonate, vinylene carbonate, propanesulfone, ethylene sulfate, dimethyl sulfone, ethyl methyl sulfone, dipropyl sulfone, dibutyl sulfone, trimethylene sulfone, tetramethylene sulfone, di(methoxyethyl)sulfone $(CH_3OCH_2CH_2)_2SO_2)$, ethyl cyclopentyl sulfone $(C_2H_5SO_2C_5H_9)$, 1,5-pentanediol, 1-methylamino-2,3-propanediol, ε-caprolactone, γ-butyrolactone, α-acetyl-γ-butyrolactone, diethylene glycol, 1,3-butylene glycol, propylene glycol, triethylene glycol dimethyl ether, tripropylene glycol dimethyl ether, diethylene glycol monobutyl ether, triethylene glycol monomethyl ether, triethylene glycol butyl methyl ether, tetraethylene glycol dimethyl ether, diethylene glycol monoethyl ether acetate, diethylene glycol monoethyl ether, triethylene glycol monobutyl ether, tetraethylene glycol monobutyl ether, dipropylene glycol monomethyl ether, diethylene glycol monomethyl ether, diethylene glycol monoisopropyl ether, ethylene glycol monoisobutyl ether, tripropylene glycol monomethyl ether, diethylene glycol methyl ethyl ether, diethylene glycol diethyl ether, polyethylene glycol, glycerin, propylene carbonate, and N-methylpyrrolidone.

* * * * *